United States Patent
Rowe

(10) Patent No.: US 9,164,641 B1
(45) Date of Patent: Oct. 20, 2015

(54) IN-CELL TOUCH SCANNING MODES FOR SIMULTANEOUS TOUCH AND DISPLAY

(71) Applicant: Cypress Semiconductor Corporation, San Jose, CA (US)

(72) Inventor: Gabriel Rowe, Kirkland, WA (US)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 0 days.

(21) Appl. No.: 14/497,170

(22) Filed: Sep. 25, 2014

Related U.S. Application Data

(60) Provisional application No. 62/004,671, filed on May 29, 2014.

(51) Int. Cl.
*G06F 3/041* (2006.01)
*G06F 3/044* (2006.01)
*G09G 3/36* (2006.01)

(52) U.S. Cl.
CPC .............. *G06F 3/044* (2013.01); *G09G 3/3655* (2013.01); *G06F 2203/04108* (2013.01); *G09G 2300/08* (2013.01)

(58) Field of Classification Search
CPC combination set(s) only.
See application file for complete search history.

(56) References Cited

U.S. PATENT DOCUMENTS

| | | | |
|---|---|---|---|
| 7,566,143 B2 * | 7/2009 | Furukawa et al. | 362/231 |
| 8,730,207 B2 | 5/2014 | Mo et al. | |
| 2002/0180675 A1 * | 12/2002 | Tobita et al. | 345/87 |
| 2010/0090975 A1 * | 4/2010 | Nagata et al. | 345/174 |
| 2011/0115733 A1 | 5/2011 | Shih | |
| 2014/0022185 A1 | 1/2014 | Ribeiro et al. | |
| 2014/0048854 A1 | 2/2014 | Wang et al. | |
| 2014/0049507 A1 | 2/2014 | Shepelev et al. | |
| 2014/0055411 A1 | 2/2014 | Zhao | |
| 2014/0111467 A1 | 4/2014 | Chen et al. | |
| 2014/0118299 A1 | 5/2014 | Wang et al. | |
| 2014/0125626 A1 | 5/2014 | Yang et al. | |

OTHER PUBLICATIONS

Mackey Bob, Innovations in Touch Sensing, Synaptics Incorporated, SID 2012. Seminar Session M-3, p. 85, 2012.

* cited by examiner

*Primary Examiner* — Van Chow
(74) *Attorney, Agent, or Firm* — Morgan, Lewis & Bockius LLP

(57) ABSTRACT

Techniques for simultaneous touch scanning and display updates are described herein. In an example embodiment, a device comprises a display and one or more integrated circuit (IC) controllers. A sensor array is integrated within the display. The display comprises a thin-film transistor (TFT) layer and a top polarizing layer, and the sensor array comprises transmit (TX) electrodes that are disposed between the TFT layer and the top polarizing layer. The one or more IC controllers are configured to simultaneously update a row of pixels in the display and to drive one or more of the TX electrodes to scan the sensor array while the row of pixels is being updated, where the one or more of the TX electrodes are not associated with the row of pixels that is being updated.

19 Claims, 20 Drawing Sheets

FIG. 4

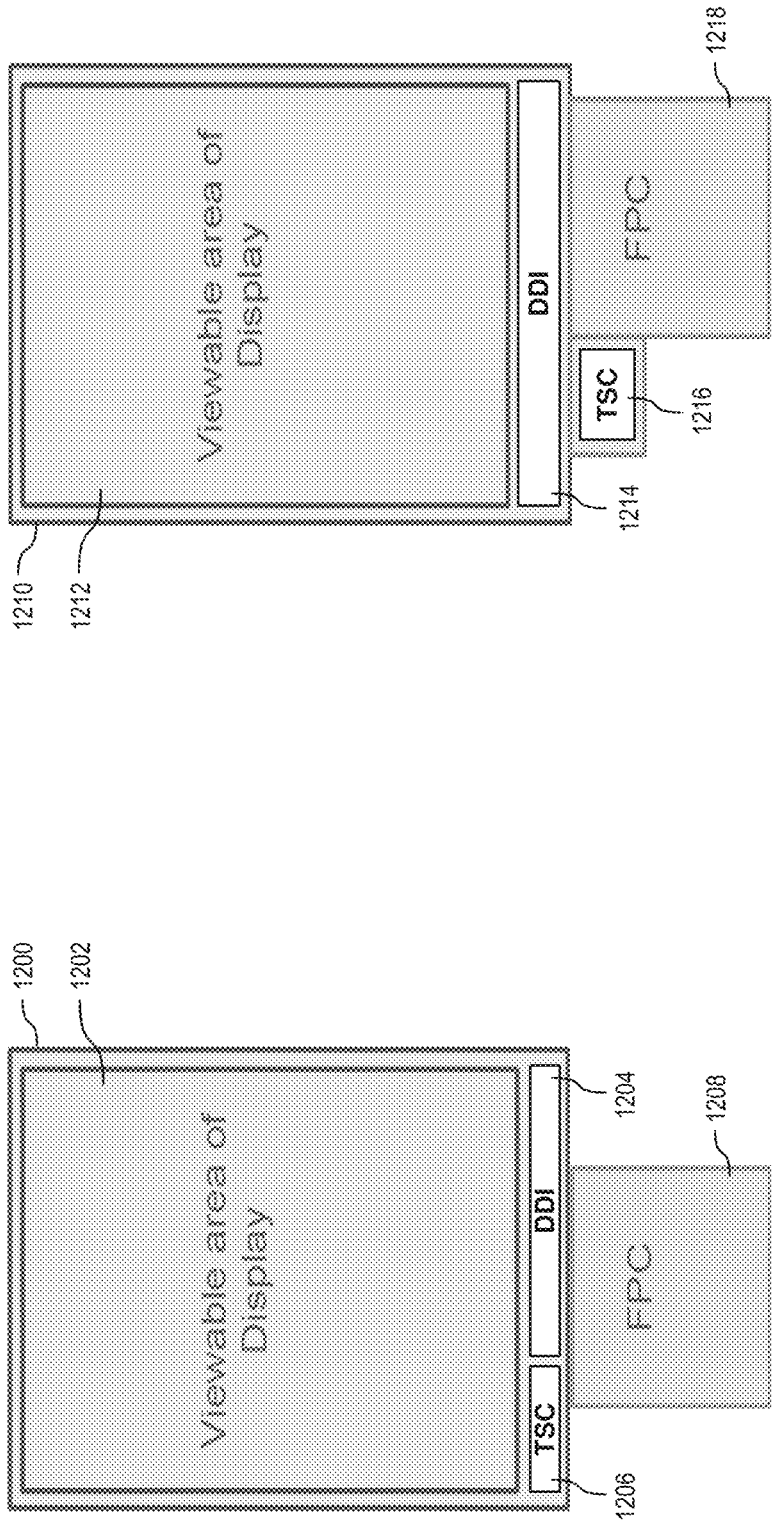

IN-CELL TOUCH SCANNING MODES FOR SIMULTANEOUS TOUCH AND DISPLAY

PRIORITY

The present application claims the priority and benefit of U.S. Provisional Patent Application No. 62/004,671, which was filed on May 29, 2014 and which is incorporated by reference herein.

TECHNICAL FIELD

This disclosure generally relates to the field of touch-sensing devices.

BACKGROUND

Devices, such as laptop computers, notebook computers, tablets, personal digital assistants, mobile communication devices (e.g., smartphones, cellphones, etc.), portable entertainment devices (e.g., handheld video games, multimedia players, etc.), and various other devices (e.g., touch monitors, TVs, DVD players, etc.) may include user interface devices that facilitate interaction between a user and the device. One type of user interface device that has become common is a touch-sensing device or touch input device that operates by way of capacitive sensing. A touch-sensing device may be embodied as a touchscreen, touch-sensing pad, touch-sensing slider, or touch-sensing buttons, and may include a display and a touch sensor comprising an array of capacitive sensor elements. Capacitive sensing typically involves scan operations that periodically charge, and measure changes in capacitance associated with, the capacitive sensor elements to determine a presence, position, and/or movement of a conductive object (e.g., a stylus, a user's finger, etc.) relative to the touch sensor.

One type of display that has become common in touch-sensing devices is a liquid crystal display (LCD). In some touch-sensing devices, a touch sensor may be at least partially integrated with a LCD display. However, as LCD displays get to larger resolutions and larger sizes (e.g., greater than 5 inches), the conventional time-division multiplexing method for updating the LCD display and the touch sensor results in both poor display and touch performance because both technologies function by transferring charge into and out of LCD pixels and touch sensor elements, respectively.

BRIEF DESCRIPTION OF THE DRAWINGS

FIG. 4 is a block diagram illustrating an example TX driving pattern according to the techniques described herein.

FIG. 12A illustrates a touch-sensing device according to an example embodiment.

FIG. 12B illustrates a touch-sensing device according to another example embodiment.

DETAILED DESCRIPTION

Figure 1A:
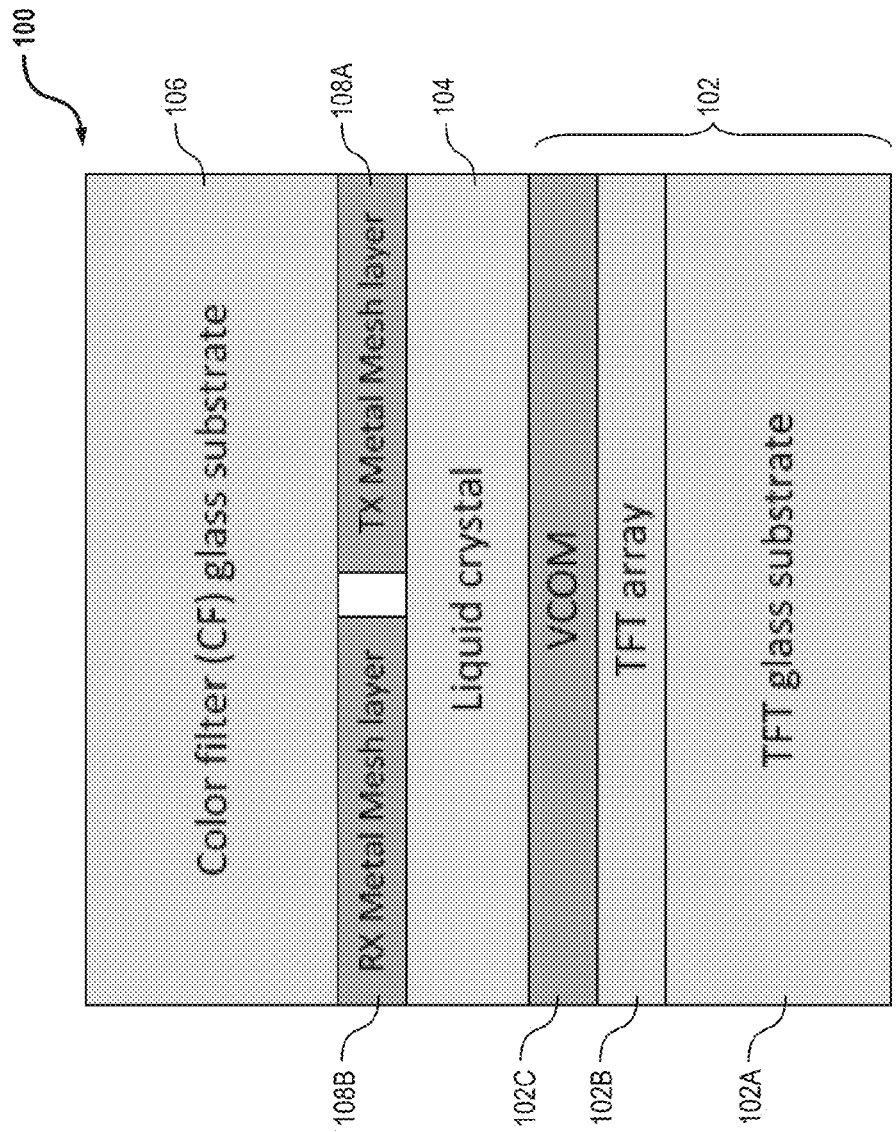
FIG. 1A illustrates a structural diagram of an example true in-cell stackup that can be used in various embodiments.

The following description sets forth numerous specific details such as examples of specific systems, components, methods, and so forth, in order to provide a good understanding of various embodiments of the techniques described herein for simultaneous touch scanning and display updates. It will be apparent to one skilled in the art, however, that at least some embodiments may be practiced without these specific details. In other instances, well-known components or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of the present invention.

Reference in the description to "an embodiment", "one embodiment", "an example embodiment", "some embodiments", and "various embodiments" means that a particular feature, structure, or characteristic described in connection with the embodiment(s) is included in at least one embodiment of the invention. Further, the appearances of the phrases "an embodiment", "one embodiment", "an example embodiment", "some embodiments", and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Overview

Described herein are various embodiments of techniques for simultaneous touch scanning and display updates. Unless expressly specified otherwise, touch sensors are also referred to herein as sensor arrays, touch sensor arrays, and the like. A contact sensed by a touch sensor may be a physical touch of a conductive object (e.g., a stylus, a user's finger, and the like) on a touch-sensing device including the touch sensor and/or may be a hover in which the conductive object is sufficiently proximate to affect the sensor elements of the touch sensor without being in physical touch with the top surface of the touch-sensing device. A sensor element (also sometimes referred to as unit cell) is a discrete unit or location area of sensor electrode(s) from which a measurement or signal can be obtained that is separate and distinct from measurements/signals obtained from other units or location areas in the touch sensor.

In order to sense a conductive object, a touch sensor may be configured for use with mutual capacitance sensing technique(s), self-capacitance sensing technique(s), and/or mixed-mode sensing techniques that include both mutual and self capacitance sensing. In mutual capacitance sensing, a touch sense controller (e.g., a touch integrated circuit, or touch IC) coupled to the touch sensor typically measures a value representing mutual capacitance present at the sensor-element area of two electrodes. A mutual capacitance of a given sensor element may include a capacitance formed between the transmit electrode and the receive electrode that form the sensor element and/or one or more conductive objects (e.g., such as a stylus or user's finger) that are electrically insulated from the sensor element. In self-capacitance sensing, a touch sense controller coupled to the touch sensor typically measures a value representing the self-capacitance of a sensor element. The self-capacitance of a given sensor element may include a capacitance formed between the sensor element and a reference voltage (e.g., such as ground) and/or one or more conductive objects. In mixed-mode sensing, a touch sense controller is configured to apply both mutual capacitance sensing and self-capacitance sensing to the same touch sensor, usually in different time slots or according to some other multiplexing scheme. The measured change(s) in the mutual capacitances and/or self-capacitances at one or more sensor elements allows the touch sense controller to determine the location of a contact on the touch sensor.

A touch sense controller measures changes in the mutual and/or self-capacitances of the touch sensor elements by performing scan operations periodically (e.g., at a certain frequency or rate). In a mutual capacitance scan operation, one set of electrodes (designated as transmit, or TX, electrodes) are driven with a scan signal that is applied thereto. Another set of electrodes of the touch sensor are designated as receive (RX) electrodes, where the RX electrodes are electrically insulated from the TX electrodes. Signal values (or measurements) representing the mutual capacitance of the sensor elements, formed at the areas where the TX and RX electrodes intersect or are interleaved with each other, may be measured by sampling a signal on each of the RX electrodes. In a self-capacitance scan operation, a set of electrodes (e.g., TX electrodes) are driven with a scan signal. Signal values (or measurements) representing the self-capacitances of the sensor elements formed by the TX electrodes may be measured by sampling the changes of the charge imparted by the scan signal on the sensor elements, with the TX electrodes being reset before each scan operation. For each (e.g., mutual, self, and/or mixed-mode) scan operation, the touch sense controller may determine a diff signal for each sensor element based on the measured signal value(s) that represent the self-capacitance and/or mutual capacitance of that sensor element. For example, a diff signal may be computed as the difference between a baseline value representing a settled (e.g., expected) capacitance of a sensor element (e.g., when a conductive object is not in contact with the touch sensor) and a measured value representing the capacitance of the sensor element that is measured as part of the scan operation (e.g., when a conductive object may or may not be in contact with the touch sensor).

To render a frame on a display such as LCD or active-matrix organic light-emitting diode (AMOLED) display, a controller (e.g., a device driver integrated circuit (IC), or DDI) updates the pixels in the display row-by-row until all pixels are refreshed and the display of the frame is completed. For example, to update a given pixel row, a DDI controller drives a gate line corresponding to the pixel row and updates all source lines, corresponding to the pixels in the row, on the driven gate line. The driving of the gate line includes performing digital-to-analog voltage conversion based on the digital information representing the frame portion to be displayed by the pixels in the given row, and then applying the converted analog voltage to the driven gate line. To complete the frame, the controller repeats the process for all rows of pixels in the display.

In a display (e.g., LCD, AMOLED, etc.) that integrates touch sensor electrodes within the display's structure, a controller needs time slots to update (e.g., refresh) the pixel rows as well as separate time slots to perform scan operations to measure the signal values representing capacitances at the sensor elements in the touch sensor. When rendering a frame on the display, a controller (e.g., a DDI) uses short periods of complete and total inactivity (quiescence periods) between the time slots of the pixel update operations in order to allow the display to dissipate any excess charge and noise. Conventionally, a controller (e.g., a DDI) or a combination of controllers (e.g., a DDI and a touch IC) uses a time-division multiplexing (TDM) technique to facilitate the update of the display pixels and the touch scan operations. For example, in conventional implementations using time-division multiplexing, a DDI controller is configured to perform touch scan operations during the quiescent periods between the display pixel update operations.

Generally, there are two primary types of schemes for conventional time-division multiplexing of display updates and touch scanning—a V-blank touch-scanning scheme and a H-blank touch-scanning scheme. The V-blank scheme uses the display V-blank period, which occurs after the entire display (e.g., LCD) is updated and a frame is rendered. The display V-blank period is a quiescent period of time during which the display is not being updated at all (e.g., no pixel voltages are being changed, no pixel lines of the display are being driven, no update activity is taking place on any pixel row, etc.) in order to allow charge and noise to settle. In the V-blank scheme, the scanning of the touch sensor elements integrated within the display (e.g., LCD) is performed during the display V-blank periods. The H-blank scheme uses the display H-blank period, which occurs periodically after a certain (e.g., fixed) number of pixel rows are updated according to the frame information. The H-blank period is a quiescent period of time during which the display is not updated at all (e.g., no pixel voltages are being changed, no pixel lines of the display are being driven, no update activity is taking place on any pixel row, etc.) In the H-blank scheme, the scanning of the touch sensor elements integrated within the display is performed during the display H-blank periods.

However, even if the touch scanning of a display (e.g., LCD, AMOLED, etc.) with integrated touch sensor electrodes is in perfect lock-step with the display update operations, the touch sensor in the display can be scanned at the display update rate or at a lower rate, but not at any higher rate. In other words, the rate (or frequency) of scanning the touch sensor is limited above by the display update rate. This upper limit on the touch-scanning rate is imposed by the quiescent time periods needed for the TDM touch-scanning schemes, and is typically disadvantageous to the touch scanning performance especially in displays with larger sizes and resolutions.

To address these and other problems with the conventional TDM touch-scanning schemes, the techniques described herein provide for simultaneous touch scanning and display updates.

In an example embodiment, a method is provided for a display (e.g., LCD, AMOLED, etc.) that comprises a thin-film transistor (TFT) layer, a top polarizing layer, and a sensor array that comprises TX electrodes, where the TX electrodes are disposed between the TFT layer and the top polarizing layer. In this embodiment, the method comprises: updating a row of pixels in the display; and while the row of pixels is being updated, driving one or more of the TX electrodes to sense at least a portion of the sensor array, where the one or more of the TX electrodes are not associated with the row of pixels that is being updated. In an example aspect of this embodiment, driving the one or more of the TX electrodes to sense the portion of the sensor array comprises driving the one or more of the TX electrodes in an area of the display that does not include the row of pixels that is being updated. In another example aspect of this embodiment, driving the one or more of the TX electrodes to sense the portion of the sensor array comprises driving the one or more of the TX electrodes according to a pattern that avoids the row of pixels, in the display, that is being updated. In another example aspect of this embodiment, driving the one or more of the TX electrodes to sense the portion of the sensor array comprises driving the one or more of the TX electrodes according to a code scheme. In another example aspect of this embodiment, a first group includes those of the TX electrodes that are even-numbered and a second group includes those of the TX electrodes that are odd-numbered, where the one or more of the TX electrodes are in one of the first or the second group and the row of pixels being updated corresponds to at least one of the TX electrodes that is in the other one of the first or the second group.

In an example embodiment, a touch-sensing device comprises a display integration structure and one or more integrated circuit (IC) controllers. The display integration structure is a portion of a display (e.g., LCD, AMOLED, etc.) that includes a sensor array integrated within the display. The display comprises a TFT layer and a top polarizing layer, and the sensor array comprises TX electrodes that are disposed between the TFT layer and the top polarizing layer. The one or more IC controllers are configured to simultaneously update a row of pixels in the display and drive one or more of the TX electrodes to scan the sensor array (e.g., concurrently with the update of the row of pixels), where the one or more of the TX electrodes are not associated with the row of pixels that is being updated. In an example aspect of this embodiment, the device further comprises an in-cell stackup in which the TX electrodes are disposed on the top side of the TFT layer or on the bottom side of a color filter layer that is disposed between the TFT layer and the top polarizing layer. In another example aspect of this embodiment, the device further comprises an on-cell stackup in which the TX electrodes are disposed between the top polarizing layer and a color filter layer that is disposed between the TFT layer and the top polarizing layer. In another example aspect of this embodiment, segments of $V_{COM}$ electrodes in a LCD display are shared as the TX electrodes of the sensor array.

In an example embodiment, a device controller comprises one or more integrated circuits. The one or more integrated circuits are configured at least to update a row of pixels in a display (e.g., LCD or AMOLED) and, while the row of pixels is being updated, drive one or more TX electrodes to sense at least a portion of a sensor array integrated within the display, where the one or more TX electrodes are not associated with the row of pixels that is being updated. In one aspect of this embodiment, the device controller is configured to couple to the display, where the display comprises a thin-film transistor (TFT) layer and a top polarizing layer, and the sensor array comprises the TX electrodes that are disposed between the TFT layer and the top polarizing layer. In one aspect of this embodiment, the device controller is configured to couple to a touchscreen panel that includes an LCD display.

In an example embodiment, a system comprises a display (e.g., LCD, AMOLED, etc.), a sensor array integrated within the display, and a controller. The display comprises a thin-film transistor (TFT) layer and a top polarizing layer. The sensor array comprises TX electrodes that are disposed between the TFT layer and the top polarizing layer. The controller is configured at least to simultaneously update a row of pixels in the LCD and drive one or more of the TX electrodes to scan the sensor array (e.g., concurrently with the update of the row of pixels), where the one or more of the TX electrodes are not associated with the row of pixels that is being updated. In example aspects of this embodiment, the system further comprises a touchscreen panel that includes the display and the sensor array, where the system may be a computer (e.g., such as a laptop or a tablet) or a mobile communication device (e.g., such as a smartphone or a cellphone).

Examples of Display Integration Structures

A conventional LCD has a layered structure that is illuminated by one or more light sources to produce visible images. In most (if not all) LCD technologies, the structure of a conventional LCD (without integrated touch sensor electrodes) includes the following main layers, arranged from bottom to top:

Bottom polarizing layer. The bottom polarizing layer of an LCD is typically a film substance that is used to polarize the light emitted by a light source of the LCD. The bottom polarizing layer is typically disposed on or below the bottom surface of a suitable substrate (e.g., glass).

Thin-Film Transistor (TFT) layer. The TFT layer includes thin-film transistors that are used to drive the LCD pixels. The TFT layer is disposed on or above the opposite side of a suitable substrate (e.g., glass) from the bottom polarizing layer. Generally, a TFT layer includes electrically active elements of the LCD such as $V_{COM}$ electrodes (which act as counter-electrodes to drive a load on the LCD pixels), source lines (which are coupled to drive the sources of the TFT transistors), gate lines (which are coupled to drive the gates of the TFT transistors), and various insulating sub-layers (which may be disposed in a grid-like fashion to separate the various electrodes and lines). Various kinds of TFT layers may be used in various LCD technologies such as, for example, IPS (in-plane switching), IPS-Pro, and aFFS (advanced Fringe-Field Switching).

Liquid crystal layer. The liquid crystal layer is disposed on or above the TFT layer of the LCD. The liquid crystal layer includes the liquid crystal molecules whose light modulating properties are used in the LCD to display frames.

Color filter layer. The color filter layer is typically disposed on or above the liquid crystal layer. The color filter layer includes resin material that is disposed on a suitable substrate (e.g., glass). The resin material, together with its substrate, acts as a color filter that provides color filtering in the LCD (e.g., for red, green, and blue colors).

Optically-Clear Adhesive (OCA) layer. The OCA layer is typically disposed on or above the substrate of the color filter layer. The OCA layer is typically comprised of an optically clear adhesive that attaches a top polarizing layer to the color filter layer.

Top polarizing layer. The top polarizing layer of an LCD is typically a film substance that is used to polarize light in a different axis than the bottom polarizing layer. The top polarizing layer is typically disposed on or above the color filter layer, and may be attached to the substrate of the color filter layer by the adhesive in the OCA layer.

In addition to the above main layers, the structure of the LCD may include additional layers and sub-layers (e.g., such as various coating layers, passivation layers, spacers, air-gap layers, metal pads, etc.) that may be needed for improved performance. Further, in some implementations the structure of a conventional LCD may also include a cover lens, which is attached by optically clear adhesive on or above the top polarizing layer and which thereby acts as the top surface of the LCD. The portion of the LCD structure between (and including) the substrates of the TFT layer and the color filter layer is commonly referred to as a cell.

The structure of a conventional AMOLED display includes a TFT layer disposed on a substrate. An active matrix of organic light-emitting diode (OLED) pixels is disposed on, or integrated onto, the TFT layer. A cathode layer is disposed on or above the OLED pixel layer, and a top polarizing layer is disposed on or above the OLED pixel layer. The OLED pixels include thin layers of organic polymers that emit light in response to electric current. The TFT layer includes an array of TFT transistors that control the current flowing to each individual pixel in conjunction with corresponding electrodes in the cathode layer. In addition to the above main layers, the structure of a conventional AMOLED display may include additional layers and sub-layers. Further, in some implementations the structure of a conventional AMOLED display may also include a cover lens that acts as the top surface of the display. The portion of the AMOLED display structure that encapsulates the OLED pixel layer (e.g., between and including the substrates of the TFT layer and the cathode layer) is referred to as an AMOLED cell.

As used herein, a display integration structure refers to a structural portion of a display that includes at least one set of touch sensor electrodes. For example, a set of electrodes of a capacitive touch sensor may be integrated within a stackup of layers in the structure of a display (e.g., LCD, AMOLED etc). In accordance with the techniques for simultaneous touch scanning and display update described herein, such stackup may be delineated as structural layers and components that are disposed between the TFT layer and the top polarizing layer of the display (e.g., LCD, AMOLED, etc). Depending on where and how the set(s) of touch sensor electrodes are integrated within the structure of the display, various embodiments of the techniques described herein may be implemented for various display integration structures such as, for example, various types of in-cell stackups and on-cell stackups.

In an in-cell stackup, the TX electrodes and/or the RX electrodes (if any) of the touch sensor are disposed within the LCD cell. The techniques for simultaneous touch scanning and display update described herein may be implemented for several types of in-cell stackups such as, for example, hybrid in-cell stackups in which only one set of touch sensor electrodes (but not the other) is disposed within the LCD cell, true in-cell stackups that do not share the $V_{COM}$ electrodes of the LCD, and true in-cell stackups that share segments of the $V_{COM}$ electrodes of the LCD as the TX electrodes of the touch sensor. It is noted that a set of consecutive $V_{COM}$ electrodes is referred to herein as a segment of $V_{COM}$ electrodes.

FIG. 1A illustrates a cross-section schematic diagram of an example true in-cell stackup that does not share the $V_{COM}$ electrodes of the LCD as TX electrodes of the touch sensor. It is noted that the schematic diagram in FIG. 1A does not necessarily show all layers and sub-layers that may be included in an actual implementation of a true in-cell stackup; thus, the schematic diagram in FIG. 1A is to be regarded in an illustrative rather than a restrictive sense. In FIG. 1A, in-cell stackup 100 comprises TFT layer 102, liquid crystal layer 104, color filter layer 106, and TX electrodes 108A and RX electrodes 108B of a touch sensor (not shown). TFT layer 102 comprises glass substrate 102A, TFT array 102B of transistors disposed on substrate 102A, and $V_{COM}$ electrodes 102C that are disposed on TFT array 102B. Liquid crystal layer 104 is disposed on TFT layer 102 and below color filter layer 106. Both TX electrodes 108A and RX electrodes 108B are disposed between liquid crystal layer 104 and color filter layer 106. A true in-cell stackup, such as stackup 100, may be implemented by patterning both the TX electrodes and the RX electrodes onto the bottom surface of the color filter substrate (e.g., glass) and/or by using other components (e.g., such as insulation material, metal bridges, vias, contact pads, etc.) to provide for proper insulation and connectivity. In some embodiments (e.g., as illustrated in FIG. 1A), the TX electrodes and the RX electrodes may be patterned as a single layer in an interleaved (e.g., interdigitated) fashion. In other embodiments, the TX electrodes and the RX electrodes may be patterned on the bottom surface of the color filter substrate in separate layers, with any necessary insulation sub-layer(s) in-between.

Figure 1B:
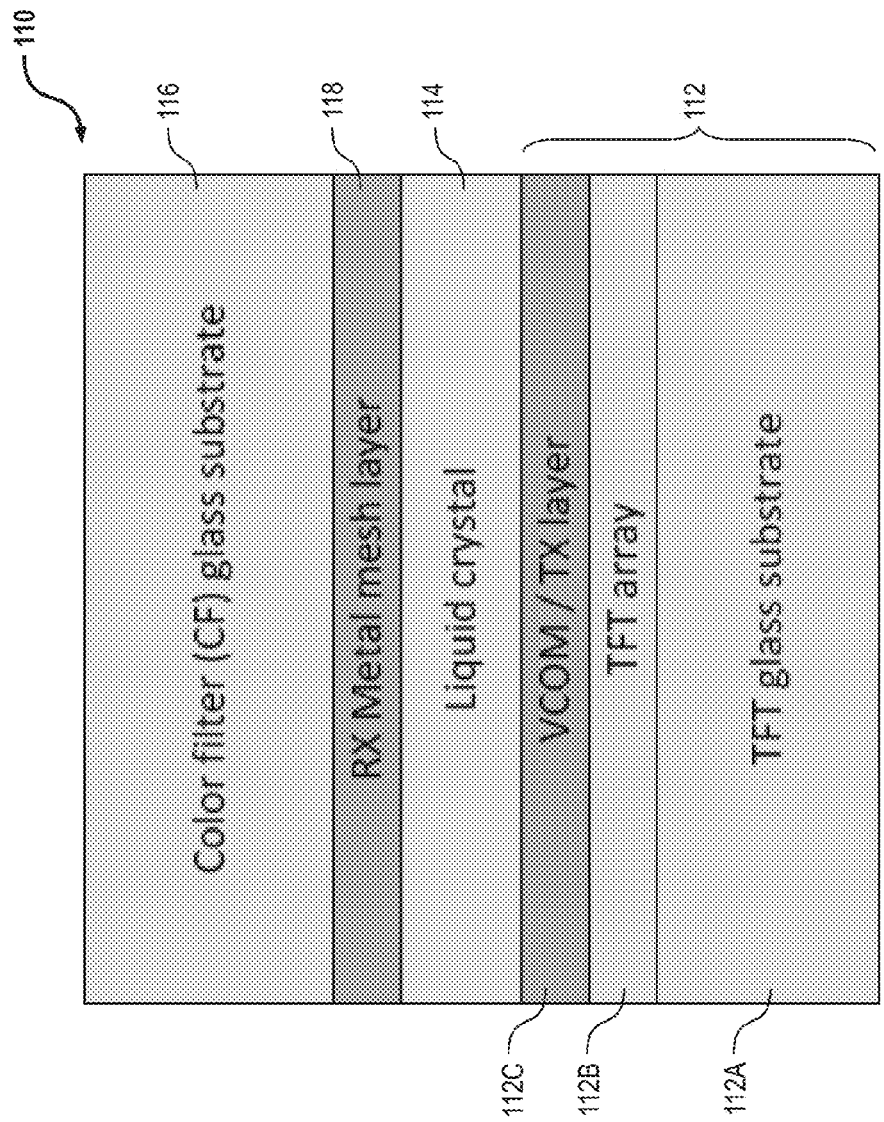
FIG. 1B illustrates a structural diagram of an example true in-cell stackup with shared LCD $V_{COM}$ electrodes that can be used in various embodiments.

FIG. 1B illustrates a cross-section schematic diagram of an example true in-cell stackup that shares segments of the $V_{COM}$ electrodes of the LCD as the TX electrodes of the touch sensor. It is noted that the schematic diagram in FIG. 1B does not necessarily show all layers and sub-layers that may be included in an actual implementation of a true in-cell stackup with shared $V_{COM}$ electrodes; thus, the schematic diagram in FIG. 1B is to be regarded in an illustrative rather than a restrictive sense. In FIG. 1B, in-cell stackup 110 comprises TFT layer 112, liquid crystal layer 114, color filter layer 116, and RX electrodes 118 of a touch sensor (not shown). TFT layer 112 comprises glass substrate 112A, TFT array 112B of transistors disposed on substrate 112A, and $V_{COM}$ electrodes 112C that are disposed on TFT array 112B. Segments of $V_{COM}$ electrodes 112C are shared as the TX electrodes of the touch sensor that is integrated in stackup 110. For example, during display update operations $V_{COM}$ electrodes 112C are used as the common counter-electrodes to drive a load on the LCD pixels, and during touch scan operations segments of $V_{COM}$ electrodes 112C are used as TX electrodes to drive scan operations on the touch sensor. Liquid crystal layer 114 is disposed on TFT layer 112. RX electrodes 118 are disposed on liquid crystal layer 114, and color filter layer 116 is disposed on the layer including RX electrodes 118. An in-cell stackup, such as stackup 110, may be implemented by patterning the $V_{COM}$ electrode layer in the form of TX electrodes, and then patterning the RX electrodes in the form of a metal mesh on the bottom surface of the color filter substrate (e.g., glass), where vias may be used to connect to metal contact pads from the (top) substrate of the color filter to the (bottom) substrate of the TFT layer.

Figure 1C:
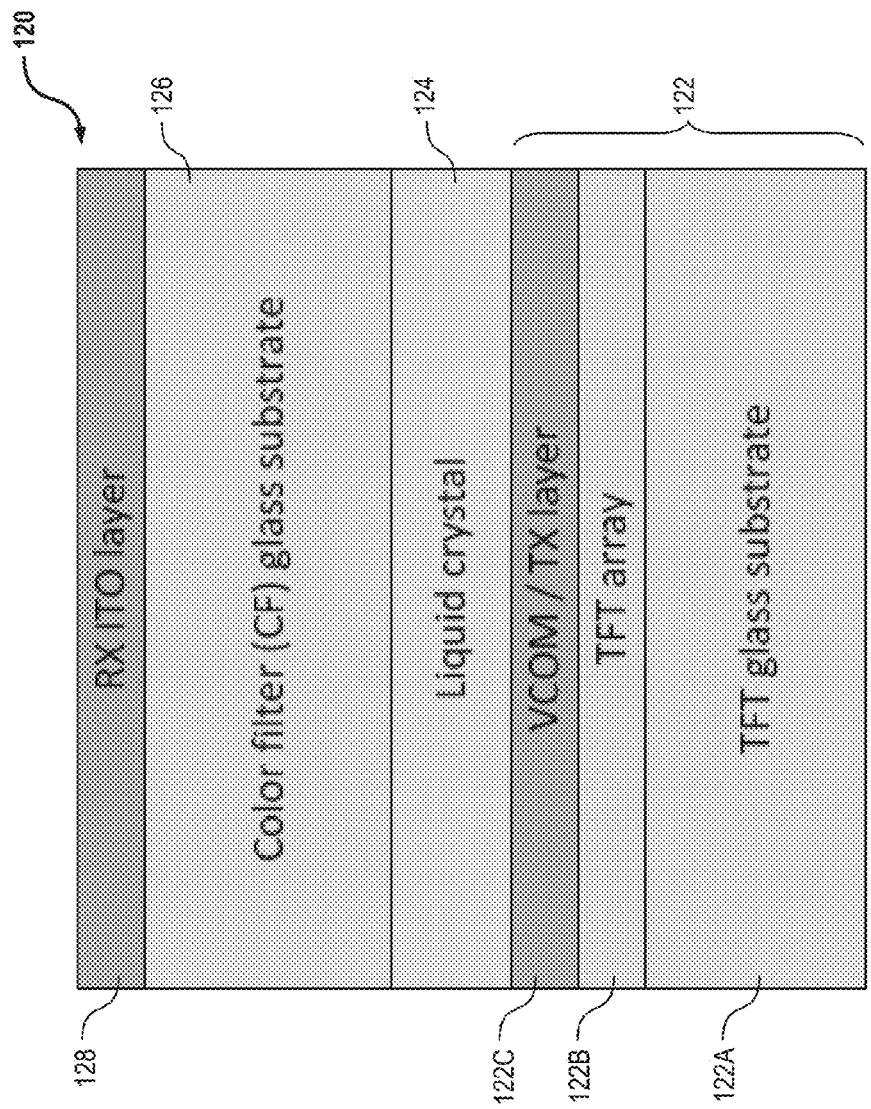
FIG. 1C illustrates a structural diagram of an example hybrid in-cell stackup with shared LCD $V_{COM}$ electrodes that can be used in various embodiments.

FIG. 1C illustrates a cross-section schematic diagram of an example hybrid in-cell stackup that shares segments of the $V_{COM}$ electrodes of the LCD as the TX electrodes of the touch sensor. It is noted that the schematic diagram in FIG. 1C does not necessarily show all layers and sub-layers that may be included in an actual implementation of a hybrid in-cell stackup; thus, the schematic diagram in FIG. 1C is to be regarded in an illustrative rather than a restrictive sense. In FIG. 1C, in-cell stackup 120 comprises TFT layer 122, liquid crystal layer 124, color filter layer 126, and RX electrodes 128 of a touch sensor (not shown). TFT layer 122 comprises glass substrate 122A, TFT array 122B of transistors disposed on substrate 122A, and $V_{COM}$ electrodes 122C that are disposed on TFT array 122B. Segments of $V_{COM}$ electrodes 122C are shared as the TX electrodes of the touch sensor that is integrated in stackup 120. For example, during display update operations $V_{COM}$ electrodes 122C are used as the common counter-electrodes to drive a load on the LCD pixels, and during touch scan operations segments of $V_{COM}$ electrodes 122C are used as TX electrodes to drive scan operations on the touch sensor. Liquid crystal layer 124 is disposed on TFT layer 122, and color filter layer 126 is disposed on liquid crystal layer 124. The layer including RX electrodes 128 is disposed outside of the cell on top of color filter layer 126. Hence, stackup 120 is a "hybrid" in-cell stackup. A hybrid in-cell stackup, such as stackup 120, may be implemented by patterning the $V_{COM}$ electrode layer in the form of TX electrodes, and then sputtering and patterning indium-tin oxide (ITO) material in the form of RX electrodes onto the top surface of the color filter substrate (e.g., glass).

Figure 1D:
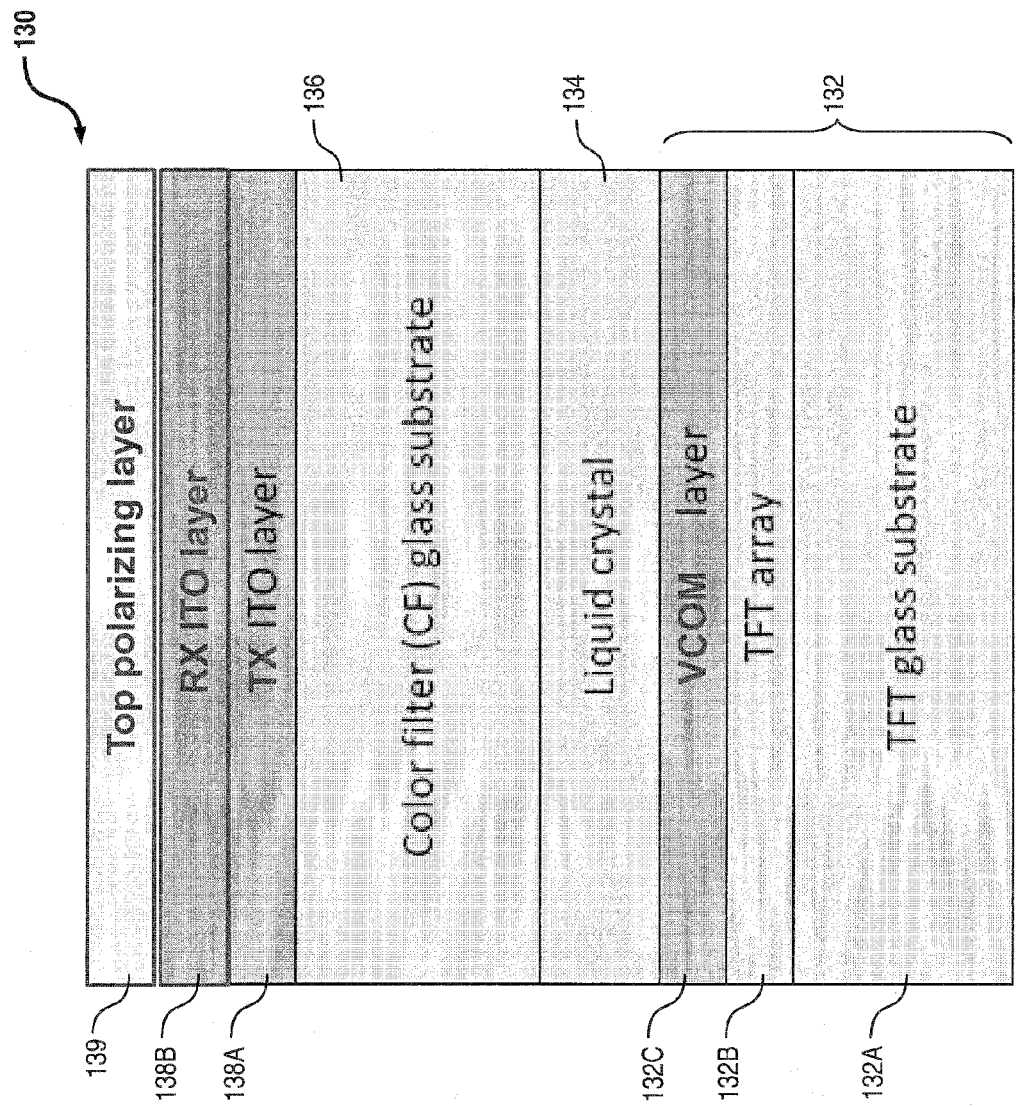
FIG. 1D illustrates a structural diagram of an example on-cell stackup that can be used in various embodiments.

The techniques for simultaneous touch scanning and display update described herein may also be implemented for various on-cell stackups. In an on-cell stackup, both the TX electrodes and the RX electrodes (if any) of the touch sensor are disposed on top of the cell but still within the structure of the LCD (e.g., below the top polarizing layer of the LCD). FIG. 1D illustrates a cross-section schematic diagram of an example on-cell stackup. It is noted that the schematic diagram in FIG. 1D does not necessarily show all layers and sub-layers that may be included in an actual implementation of an on-cell stackup; thus, the schematic diagram in FIG. 1D is to be regarded in an illustrative rather than a restrictive sense. In FIG. 1D, on-cell stackup 130 comprises TFT layer 132, liquid crystal layer 134, color filter layer 136, and TX electrodes 138A and RX electrodes 138B of a touch sensor (not shown). TFT layer 132 comprises glass substrate 132A, TFT array 132B of transistors disposed on substrate 132A, and $V_{COM}$ electrodes 132C that are disposed on TFT array 132B. Liquid crystal layer 134 is disposed on TFT layer 132, and color filter layer 136 is disposed on liquid crystal layer 134. The layer including TX electrodes 138A is disposed outside of the cell on top of color filter layer 136, and the layer including RX electrodes 138B is disposed above the layer including TX electrodes 138A. Hence, stackup 130 is an on-cell stackup. An on-cell stackup, such as stackup 130, may be implemented in various ways—for example, by patterning ITO material in the form of TX electrodes onto the top surface of the color filter layer, then disposing a layer of insulation material thereon, and then patterning ITO material in the form of RX electrodes onto the insulation layer and below the top polarizing layer 139 of the LCD. In some embodiments (e.g., as illustrated in FIG. 1D), the TX electrodes and the RX electrodes may be patterned on the top surface of the color filter substrate in separate layers, with any necessary insulation sub-layer(s) in-between. In other embodiments, the TX electrodes and the RX electrodes may be patterned within a single layer in an interleaved (e.g., interdigitated) fashion.

In various embodiments, AMOLED displays may use display integration structures that are similar to the in-cell and on-cell stackups illustrated in FIGS. 1A-1D. For example, in some embodiments the TX electrodes and/or the RX electrodes (if any) of the touch sensor may disposed as part of an in-cell stackup within an AMOLED cell. Similarly, in some embodiments both the TX electrodes and the RX electrodes (if any) of the touch sensor maybe disposed on top of an AMOLED cell but still within the structure of the AMOLED display (e.g., below the top polarizing layer of the AMOLED display). Thus, the techniques for simultaneous touch scanning and display updates described herein are not limited to any particular type of display structure, but rather may be used with any cell-based display technology.

The techniques for simultaneous touch scanning and display update described herein may be implemented in systems that may place the touch sense controller (e.g., touch IC) and the display update controller (e.g., DDI) in various locations and that may use a combined DDI/touch-sense controller instead of two separate controllers to facilitate touch scanning and display update.

Examples of Simultaneous Touch Scanning and Display Updates

Figure 2:
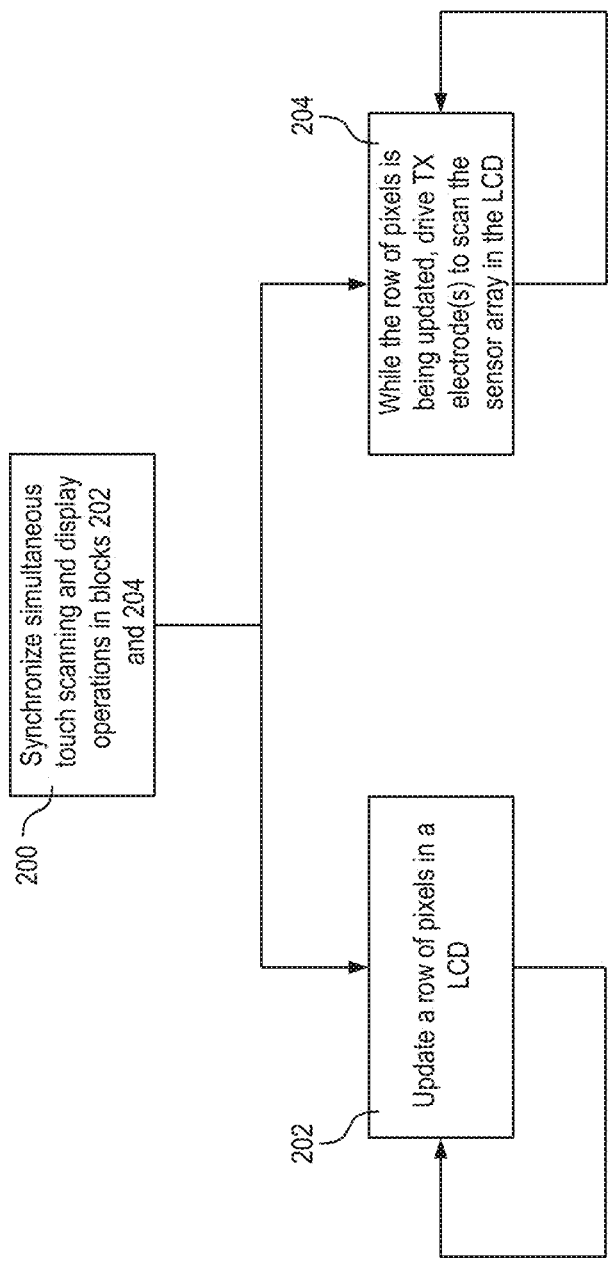
FIG. 2 is a flow diagram illustrating an example method for simultaneous touch scanning and display updates according to the techniques described herein.

FIG. 2 is a flow diagram illustrating an example method for simultaneous touch scanning and display updates in a display (e.g., LCD, AMOLED, etc.) with an integrated touch sensor, in accordance with the techniques described herein. Various implementations and embodiments may use different types and numbers of controllers to perform the operations of the method in FIG. 2. For example, in some embodiments the method in FIG. 2 may be performed by an integrated circuit (IC) controller that is configured to drive both updates of a display and touch scan operations on a touch sensor integrated within the display. In some embodiments of the method in FIG. 2, an IC controller (e.g., such as DDI) may be configured to drive the display updates while a different IC controller (e.g., such as touch IC) may be configured to drive the touch scan operations of the touch sensor integrated within the display. Further, in various embodiments an IC controller may perform some or all of operations of the method in FIG. 2 by using hardware logic, firmware and/or software instructions that are executed by a processor within the IC controller, and/or a combination of hardware logic and firmware/software instructions. Thus, the description hereinafter of the method in FIG. 2 is to be regarded in an illustrative rather than a restrictive sense.

In block 200, the display update operations (of block 202) are synchronized with the touch scan operations (of block 204), so that the display update operations are performed simultaneously with the touch scan operations. For example, in some embodiments an IC controller may be configured to drive both the display update operations and the touch scan operations concurrently. In such embodiments, the IC controller may perform the simultaneous synchronization based on common clock(s) and/or other internal signal(s). In some embodiments, a DDI controller may be configured to drive the display update operations, while a separate touch IC controller may be configured to drive the touch scan operations simultaneously with the display update operations. In such embodiments, the DDI controller is coupled to the touch IC controller, and the touch IC controller uses synchronization signal(s) received from the DDI controller to synchronize the touch scan operations with the display update operations, where the synchronization signal(s) may include the actual (e.g., H-synch and/or V-synch) signal(s) that the DDI controller uses to drive the display and/or a signal that is derived from such actual signal(s).

In block 202, an IC controller updates a row of pixels in the display. For example, a DDI controller may drive the $V_{COM}$ electrode corresponding to the row of LCD pixels and may apply the appropriate voltages to the source and gate lines of the pixels in that row according to the frame being displayed. Once the update of the row of pixels is complete, the IC controller moves to the next row of pixels and repeats the update process.

While a row of pixels is being updated by the operations of block 202, in block 204 the same or a different IC controller performs at least one scan operation that includes driving one or more TX electrodes of the touch sensor that is integrated within the LCD. The one or more TX electrodes being driven are not associated with the row of pixels that is being updated concurrently therewith. For example, the one or more TX electrodes may correspond to an area of the LCD that does not include the row of pixels that is being updated. In another example, the one or more TX electrodes may be driven according to a pattern that is synchronized in a way that avoids any TX electrodes that correspond to the row of pixels being updated. In another example, the one or more TX electrodes may be driven according to a code scheme that skips the row of pixels that is being updated. In another example, the even-numbered TX electrodes of the touch sensor may be considered as part of a first group and the odd-numbered TX electrodes may be considered as part a second group. Thus, one or more even-numbered TX electrodes (from the first group) may be driven when the row of pixels being updated corresponds to odd-numbered TX electrode(s) (in the second group); conversely, one or more odd-numbered TX electrodes (from the second group) may be driven when the row of pixels being updated corresponds to even-numbered TX electrode(s) (in the first group). The IC controller continuously repeats the scan operation(s) of the integrated touch sensor by driving different TX electrodes while various rows of LCD pixels are being updated concurrently therewith, and the synchronization operations (of block 202) ensure that any TX electrode being driven would not correspond to (e.g., overlap with) a row of pixels that is being updated.

In this manner, instead of performing conventional time-division multiplexing of touch scan and display update processes that requires quiescent periods, the techniques described herein allow for meshing the two processes more tightly together. A display process updates only a small portion of the display (e.g., LCD, AMOLED, etc.) at a given time (e.g., one row of pixels in a portrait display with a 1920×1080 resolution would take about 8us at an update rate of 60 Hz). So if an IC controller drives TX electrodes in the area of the display not being updated by the display process, then the charge being transferred to the pixel row being updated is not affected. And if the IC controller drives the touch scan operations at a certain scan frequency or varies this frequency such that a large percentage of the touch scan measurements are not strongly affected by the display update process, then the scan measurements of the touch sensor as a whole will be much less affected by the display update process. By combining both the TX driving patterns and scan frequencies in a way that avoids the display update process, the techniques described herein allow for scanning the integrated touch sensor at any time and at much higher frequencies than the conventional time-division multiplexing, while still obtaining improved signal and reduced noise.

In some LCD-based embodiments that use shared $V_{COM}$ electrodes, the techniques for simultaneous touch scanning and display updates described herein rely on the concept of holding at a minimum the segment of $V_{COM}$ electrodes that includes the counter-electrode for the horizontal row of pixels that is being updated. The remaining (e.g., segments of) $V_{COM}$ electrodes can be driven by a TX waveform to perform a touch scan operation. If a multi-TX code scheme having no limit on the number of TX electrodes being driven is used to drive the touch scan operations, then the remaining (e.g., segments of) shared $V_{COM}$ electrodes could be driven as TX electrodes during touch scanning.

Figure 3:
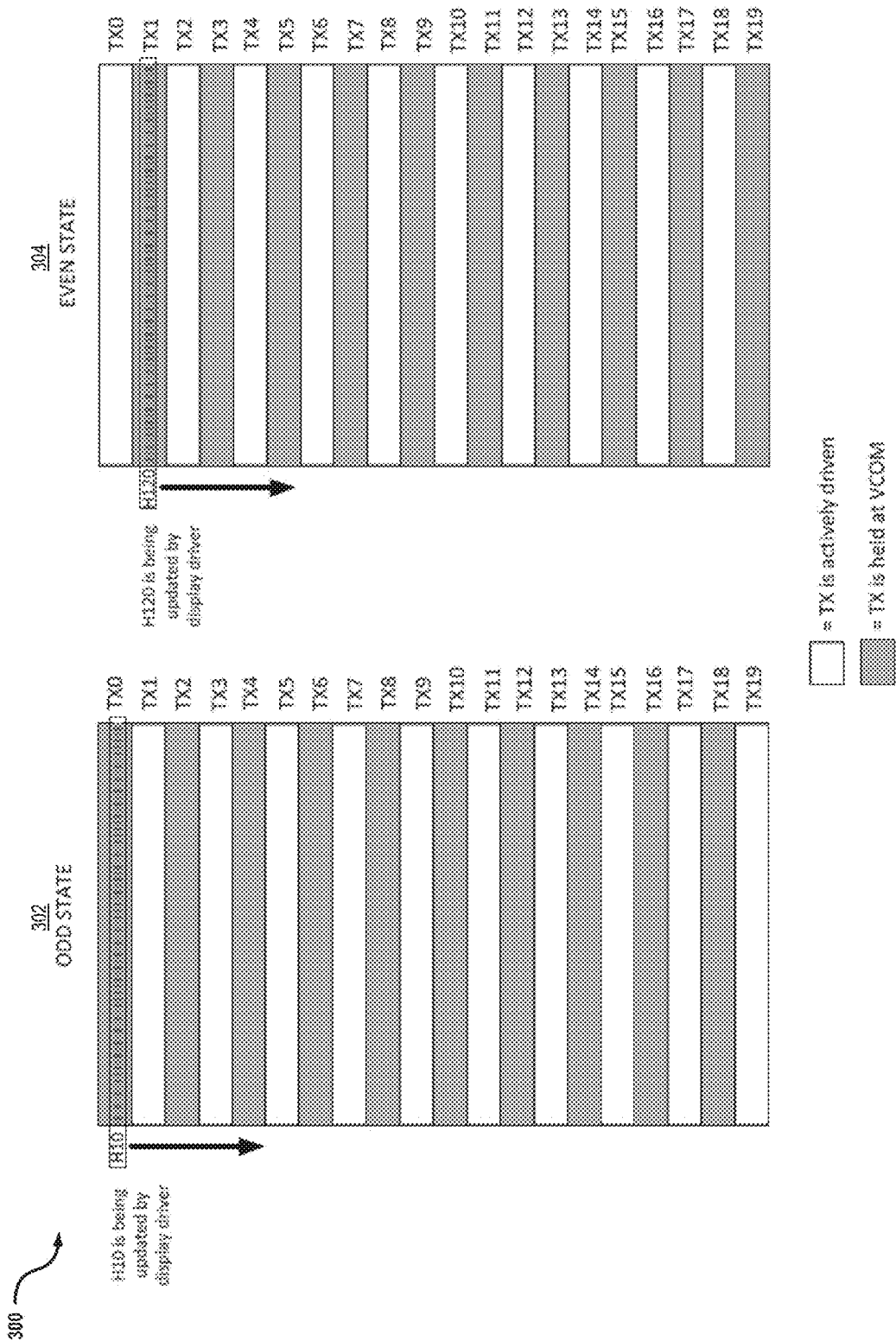
FIG. 3 is a block diagram illustrating example touch scanning modes according to the techniques described herein.

In an example embodiment of the techniques described herein, the TX electrodes are split into an "ODD" group and an "EVEN" group based on their internal numbering. In this embodiment, when an LCD update operation is updating a particular horizontal row of pixels that is above (e.g., overlaps) a TX electrode from the "ODD" group, an IC controller is free to perform touch scan operations on the TX electrodes in the "EVEN" group, and vice versa. This is illustrated in FIG. 3. Scheme 300 in FIG. 3 illustrates TX driving modes while the LCD is being updated. The goal of the scheme is to avoid the TX electrode corresponding to the $V_{COM}$ electrode that is being updated by the display update operation. By toggling between state 302 ("ODD") and state 304 ("EVEN"), the firmware implementation of this embodiment can be simplified.

By performing "ODD/EVEN" TX driving modes, an IC controller can achieve touch sensor scan rates that are only limited by the time it takes for the horizontal line display update to move from one TX electrode to another. For example, in a LCD with a 1280×800 resolution that has 20 horizontal lines of TX electrodes, each TX electrode would cover (e.g., overlap with) 64 horizontal rows of pixels. Thus, if the display update uses an update rate of 60 Hz, then each $1120^{th}$ of the display update would take 830 us. Since for 20 lines of TX electrodes a switch from "ODD" to "EVEN" states (and vice versa) needs to be performed 10 times, different scan rates can be achieved depending upon how many TX electrode blocks (or subsets of TX electrodes) need to be scanned fully between any two switches from "ODD" to "EVEN" states and vice versa. For example, if 4 TX electrode blocks per frame are used, then Table 1 below illustrates how the TX slots may be configured with respect to a segment (e.g., indicated by "DisplayPos") that includes the row of pixels being updated.

TABLE 1

Example TX Slots for "ODD/EVEN" TX Driving Modes

| Display Position | TX Slot |
| --- | --- |
| DisplayPos=0 | TX slot0: 1, 3, 5, 7, 9, 11, 13, 15, 17, 19 (ODD), $1^{st}$ time |
| DisplayPos=1 | TX slot0: 0, 2, 4, 6, 8, 10, 12, 14, 16, 18 (EVEN), $1^{st}$ time |
| DisplayPos=2 | TX slot1: ODD, $2^{nd}$ time |
| DisplayPos=3 | TX slot2: EVEN, $2^{nd}$ time |
| DisplayPos=4 | TX slot3: ODD, $3^{rd}$ time |
| DisplayPos=5 | TX slot2: EVEN, $3^{rd}$ time |
| DisplayPos=6 | TX slot3: ODD, $4^{th}$ time |
| DisplayPos=7 | TX slot2: EVEN, $4^{th}$ time |
| DisplayPos=8 | TX slot3: ODD, $5^{th}$ time |
| DisplayPos=9 | TX slot2: EVEN, $5^{th}$ time |
| DisplayPos=10 | TX slot3: ODD, $6^{th}$ time |
| DisplayPos=11 | TX slot2: EVEN, $6^{th}$ time |
| DisplayPos=12 | TX slot3: ODD, $7^{th}$ time |
| DisplayPos=13 | TX slot2: EVEN, $7^{th}$ time |
| DisplayPos=14 | TX slot3: ODD, $8^{th}$ time |
| DisplayPos=15 | TX slot2: EVEN, $8^{th}$ time |
| DisplayPos=16 | TX slot3: ODD, $9^{th}$ time |
| DisplayPos=17 | TX slot2: EVEN, $9^{th}$ time |
| DisplayPos=18 | TX slot3: ODD, $10^{th}$ time |
| DisplayPos=19 | TX slot2: EVEN, $10^{th}$ time |

In this manner, a 120 Hz scan rate can be achieved by grouping half of the TX electrodes together, so the "ODD" and "EVEN" groups would be both scanned 5 times in one touch frame. This can be represented as follows:

TouchScan1={O,E,O,E,O,E,O,E,O,E} ~8 ms
TouchScan2={O,E,O,E,O,E,O,E,O,E} ~8 ms

Figure 4:
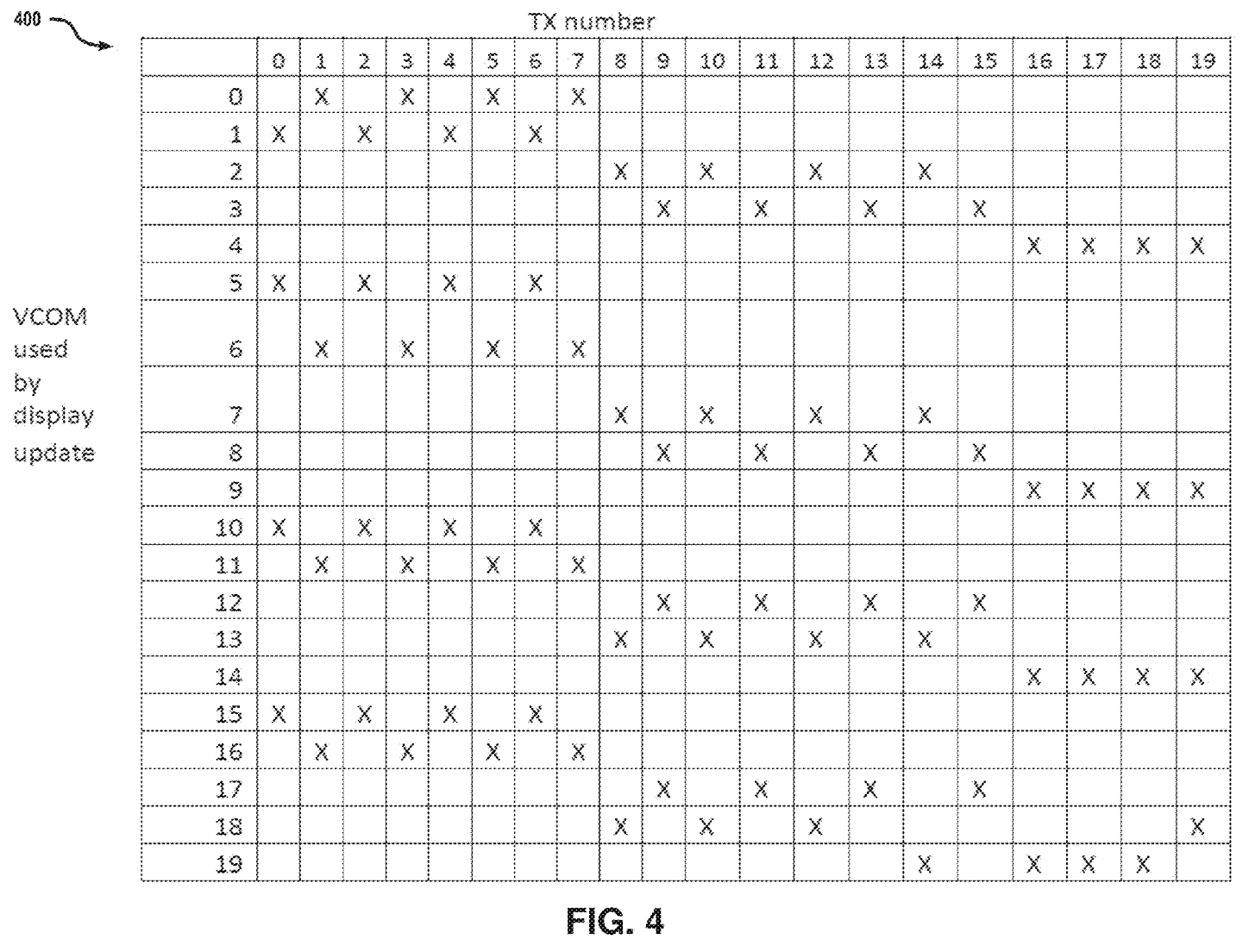

Some embodiments of the techniques for simultaneous touch scanning and display updates described herein may use multi-TX4 groups to perform touch scan operations. In an example embodiment, the touch scanning mode would be split into four groups of TX electrodes of the touch sensor. FIG. 4 illustrates a TX4 driving pattern 400 that avoids the segment of $V_{COM}$ electrodes that are being used for display update. According to driving pattern 400, there are four groups of TX electrodes that are organized according $V_{COM}$ segments 0-4, 5-9, 10-14, 15-19, respectively (with the TX electrodes in each group being marked by an "X"). Each of the four groups is scanned periodically with the goal to avoid using the $V_{COM}$ segment that is being concurrently used by the display update. The diagonal of the matrix illustrated in FIG. 4 is completely empty, which indicates that the touch scan operations do not occur on a row of pixels that is being updated. According to driving pattern 400, an IC controller can drive each TX electrode 4 times per 16.6 ms display refresh period. This method can achieve scan rates of either 60 Hz, 120 Hz, or 240 Hz, with decreasing levels of signal-to-noise ratio (SNR).

It is noted that FIG. 4 illustrates only an example TX driving pattern, but various other patterns can be created in various embodiments and implementations. Such various driving patterns may be based on code schemes in which a mask or a filter can be applied to signal(s) on the RX electrodes to determine from which TX electrode(s) the signal(s) came from. For example, one such code scheme may use a truly orthogonal-basis set of codes, where an IC controller can drive the TX electrodes of the touch sensor according to the scheme and can decode the signal(s) received on the RX electrodes according to the same scheme.

RX Line Noise Coupling

In some embodiments, the touch scan measurements obtained from the RX electrodes of an integrated touch sensor may be affected by noise from the LCD's TFT layer. In such cases of noise coupling, the magnitude of the signal that is coupled from the source and gate lines (of the transistors in the TFT layer) to the TX and RX electrodes (of the touch sensor) depends upon the stackup. A type of stackup commonly used in LCDs is the hybrid in-cell stackup. In some hybrid in-cell stackups, the coupling to the RX electrode may be reduced by a carefully selected design. For example, a signal from the gate line of a pixel row couples weakly to the RX electrode when the gate line is routed perpendicular to the RX electrode. However, such design workarounds for reducing noise coupling may not be applicable to other hybrid in-cell stackups. For example, some hybrid in-cell stackups have the RX electrodes inside the cell, which may cause a large coupling from the source lines of the pixel rows. This problem is exacerbated in display integration structures in which RX electrodes sit directly on top of the source lines. In such display integration structures, for TX electrodes that do not correspond to (e.g., overlap) a portion of the LCD that is being updated, the path for current injection into these TX electrodes is primarily through the source lines that overlap the $V_{COM}$ electrodes, so the parasitic capacitance between these elements may be large. Example circuit schematics with regards to noise coupling in such display integration structures are illustrated in FIGS. 5A and 5B.

Figure 5A:
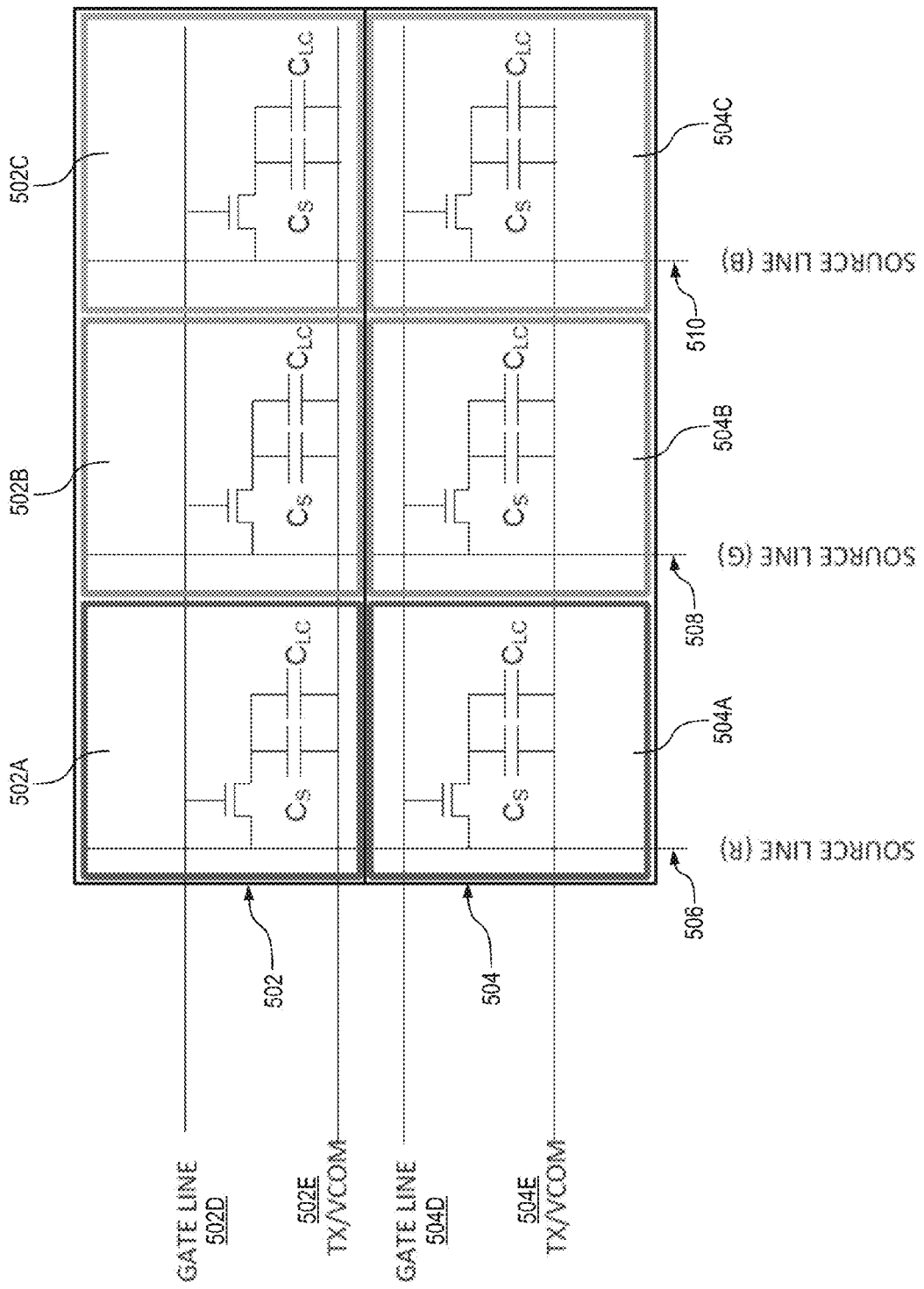
FIGS. 5A and 5B illustrate circuit schematics for some types of hybrid in-cell display integration structures that may be used in example embodiments.

FIG. 5A illustrates a circuit schematics for an example hybrid in-cell stackup that may be used in some embodiments. LCD display pixel 502 includes sub-pixels 502A ("red" sub-pixel), 502B ("green" sub-pixel), and 502C ("blue" sub-pixel). Pixel 502 also includes gate line 502D and $V_{COM}$ electrode 502E, which is shared as part of a TX electrode of a touch sensor that is integrated in the structure of the LCD. Gate line 502D is coupled to the gates of the TFT transistors in each of sub-pixels 502A, 502B, and 502C. Similarly, LCD display pixel 504 includes sub-pixels 504A ("red" sub-pixel), 504B ("green" sub-pixel), and 504C ("blue" sub-pixel). Pixel 504 also includes gate line 504D and $V_{COM}$ electrode 504E, which is shared as part of a TX electrode of the integrated touch sensor. Gate line 504D is coupled to the gates of the TFT transistors in each of sub-pixels 504A, 504B, and 504C. A source line 506 for "red" color is coupled to the sources of the TFT transistors in the "red" sub-pixels (e.g., such as sub-pixels 502A and 504A), a source line 508 for "green" color is coupled to the sources of the TFT transistors in the "green" sub-pixels (e.g., such as sub-pixels 502B and 504B), and a source line 510 for "blue" color is coupled to the sources of the TFT transistors in the "blue" sub-pixels (e.g., such as sub-pixels 502C and 504C).

In a typical LCD, a $V_{COM}$ electrode is capacitively coupled to the transistor drains of the pixels in a given pixel row in order to drive away the load from the pixels in that row. The $V_{COM}$ electrode effectively acts as a counter-electrode and operates by applying an appropriate voltage so that current can flow away from the transistor drains of the pixels when the source and gate lines of the transistors are floating. For example, in the hybrid in-cell stackup of FIG. 5A, $V_{COM}$ electrode 502E is capacitively coupled to the drains of the TFT transistors in each of sub-pixels 502A, 502B, and 502C. Thus, capacitances $C_S$ and $C_{LC}$ are formed in each of sub-pixels 502A, 502B, and 502C, where $C_S$ is the capacitance that holds the charge of the given sub-pixel for a certain period of time, and $C_{LC}$ is the capacitance formed by the active part of the given sub-pixel (e.g., the capacitance of the liquid crystal material in the sub-pixel).

Figure 5B:
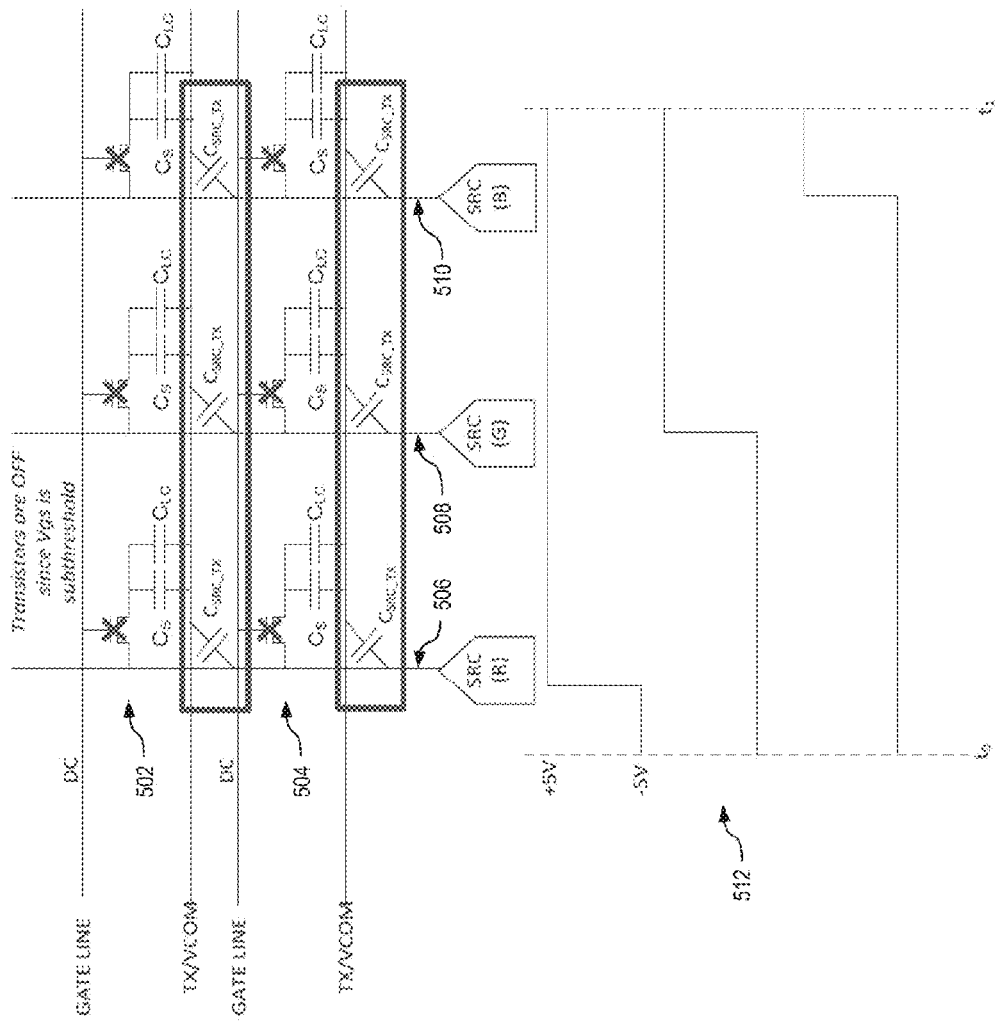

FIG. 5B illustrates a circuit schematics for the hybrid in-cell stackup of FIG. 5A, when pixels 502 and 504 are not part of the portion of the LCD that is being updated. In FIG. 5B, pixels 502 and 504 are not being updated, but the sources of their TFT transistors are coupled to source lines 506, 508, and 510 that are being driven, according to timing diagram 512, to update some other row of pixels in the LCD (or a portion thereof). When pixels 502 and 504 are not being updated, the gates of the TFT transistors in each of the corresponding sub-pixels are floating. Thus, the $V_{COM}$ electrodes of pixels 502 and 504 can be driven for touch scanning because the charge in these pixels' $C_S$ capacitors will not flow away. For example, as illustrated in FIG. 5B, the difference between the gate voltages and the source voltages of the TFT transistors, $V_{GS}$ ($V_{GS}=V_G-V_S$), is below the threshold value which turns on the transistors of pixels 502 and 504. Thus, the $V_{COM}$ electrodes of pixels 502 and 504 can be driven as part of a segment of $V_{COM}$ electrodes to scan the touch sensor integrated in the LCD.

However, source lines 506 (for red color), 508 (for green color), and 510 (for blue color) are capacitively coupled to the $V_{COM}$ electrodes of pixels 502 and 504. Thus, a capacitance $C_{SRC\_TX}$ is formed in each sub-pixel of pixels 502 and 504. $C_{SRC\_TX}$ is a parasitic capacitance that is formed between each of the source lines (506, 508, and 510) and the $V_{COM}$ electrodes of pixels 502 and 504. To minimize such parasitic capacitance, the segment of $V_{COM}$ electrodes being updated (e.g., the segment including the $V_{COM}$ electrode of the pixel row being updated) must have its $V_{COM}$ electrodes held at the correct potential, while the $V_{COM}$ electrodes in the other, not-being-updated segments can be driven to another voltage (e.g., such as a voltage for touch scanning). The pixels not within the $V_{COM}$ segment currently being updated look like single ended capacitances since their TFT transistors are in the cut-off state, as illustrated in FIG. 5B.

Figure 6A:
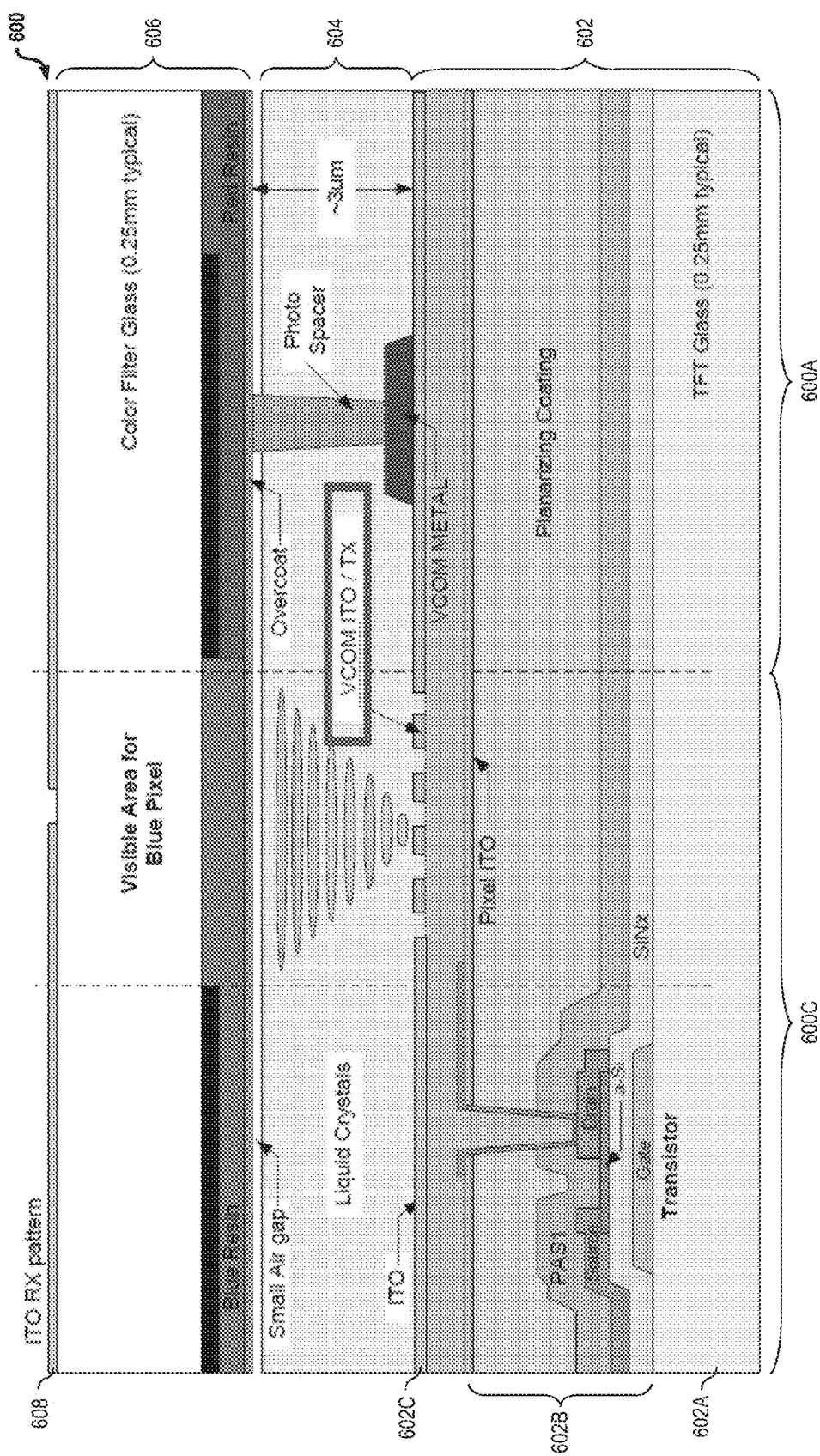
FIG. 6A illustrates a cross-section of a portion of a pixel in a display integration structure that can be used in example embodiments.

The actual structure of a LCD display pixel is complex, as illustrated in FIG. 6A for an example pixel having an example display integration structure. Pixel 600 has a hybrid in-cell stackup that may be used by various LCD technologies such as IPS-Pro and FFS. In FIG. 6A, the in-cell stackup of pixel 600 comprises TFT layer 602, liquid crystal layer 604, color filter layer 606, and RX electrodes 608 of a touch sensor (not shown). TFT layer 602 comprises glass substrate 602A, TFT array 602B of transistors disposed on substrate 602A, and $V_{COM}$ layer 602C that is disposed on TFT array 602B. TFT array 602B includes the transistors of the TFT array and any other necessary sub-layers and components such as, for example, any sub-layers that form the TFT transistors, a passivation sub-layer, a planarizing coating sub-layer, and any contact and/or bonding pads. $V_{COM}$ layer 602C includes $V_{COM}$ electrodes that are patterned from ITO material. Segments of $V_{COM}$ electrodes 602C are shared as the TX electrodes of the touch sensor (not shown) that is integrated in the LCD. Liquid crystal layer 604 is disposed on TFT layer 602. Liquid crystal layer 604 includes the liquid crystal molecules that form the LCD cells as well as any other necessary sub-layers and components (e.g., such as photo spacers and pads). Color filter layer 606 is disposed above liquid crystal layer 604 over a small air-gap that is formed by virtue of the photo spacers being raised above the liquid crystal layer. Color filter layer 606 includes resin material for several colors (e.g., red and blue being illustrated) that is disposed on the bottom surface of a glass substrate. RX layer 608 includes RX electrodes that are patterned from ITO material on the top surface of the glass substrate of color filter layer 606. It is noted that FIG. 6A illustrates a portion of pixel 600 that includes "red" sub-pixel 600A and "blue" sub-pixel 600C (but a "green" sub-pixel, e.g., such as 600B, is not illustrated).

Figure 6B:
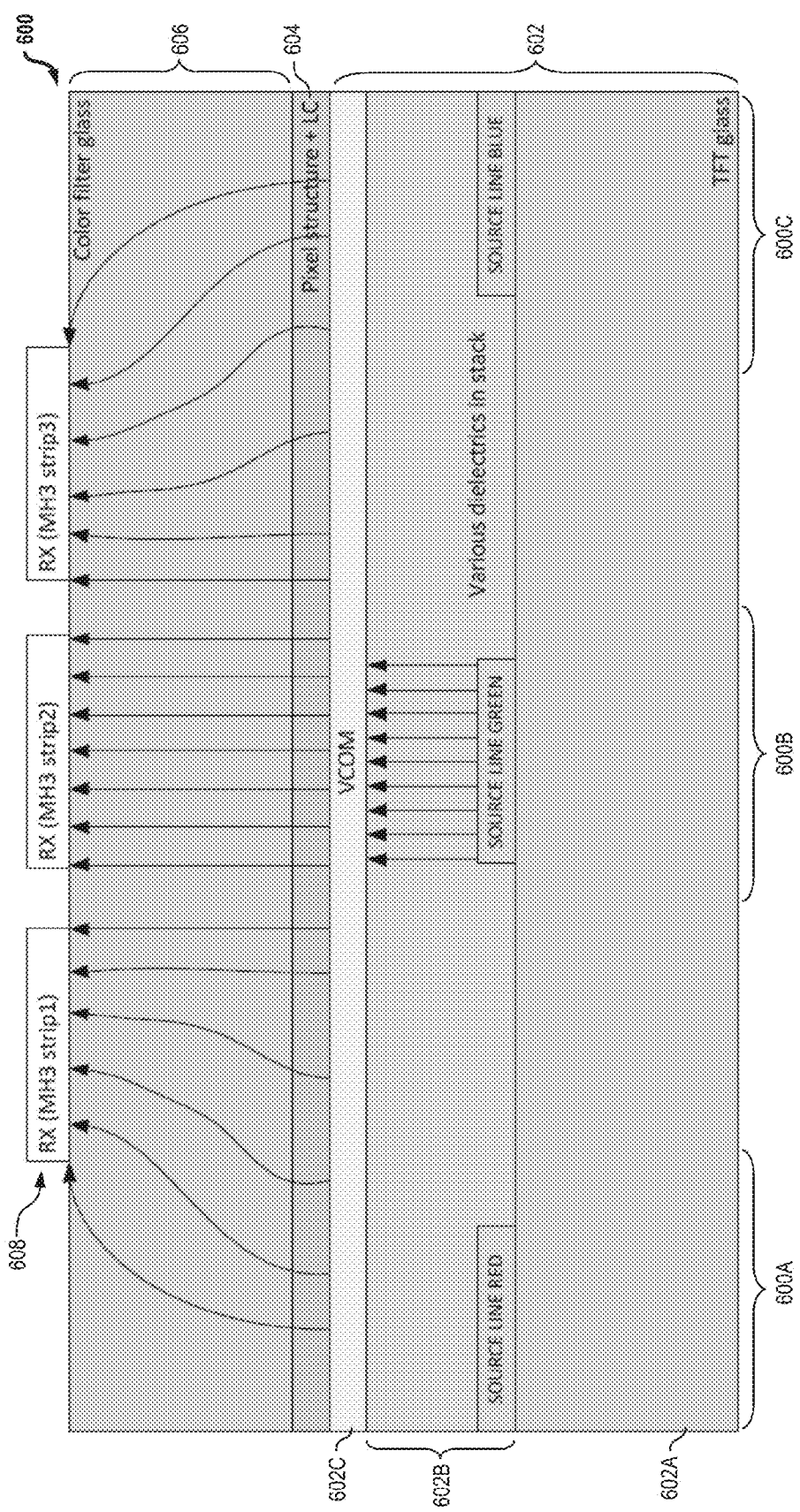
FIG. 6B illustrates a simplified diagram of an example display integration structure, e.g., such as the display integration structure of FIG. 6A.

FIG. 6B illustrates a simplified diagram of an example pixel, e.g., such as a pixel in accordance with the display integration structure of FIG. 6A. The simplified diagram of FIG. 6B is focused on source line coupling, assuming that only one of the "red", "green", and "blue" source lines is being driven at one time. Pixel 600 in FIG. 6B includes sub-pixels 600A ("red" sub-pixel), 600B ("green" sub-pixel), and 600C ("blue" sub-pixel), with the source line of "green" sub-pixel 600B illustrated as being driven. The sub-layers of various dielectrics in TFT array 602B may be less than 5 um. The pixel structure with the liquid crystal material in liquid crystal layer 604 may be around 5 um. Color filter layer 606 may be around 0.25 mm thick.

The simplified diagram of FIG. 6B illustrates how the source lines of the transistors in the TFT array 602B couple to the $V_{COM}$ layer 602C and to the RX electrodes in RX layer 608, in some embodiments. It can be assumed that the source line to $V_{COM}$ layer capacitance is very large because of both the proximity of source lines to the $V_{COM}$ layer as well as the large number of source lines. Therefore, whatever voltage is on the source line will appear on the $V_{COM}$ layer independent of which horizontal row of display pixels is being updated, albeit somewhat attenuated. If the $V_{COM}$ layer is effectively re-transmitting the source line signal, then the source line signal will couple to the RX electrodes along the entire length of the RX line. If a touch-sensor unit cell (e.g., formed by a TX electrode and a RX electrodes) has mutual capacitance $C_m$=0.85 pF, then the noise coupled from the $V_{COM}$ layer to the RX electrodes for 20 TX electrodes (TXnum=20) will be TXnum*Cm=20*0.85 pF=17 pF. Therefore, a large voltage will be coupled to the RX electrodes when the source lines switch. However, there may be some mitigating factors that may reduce this voltage. For example, for one coupling of a TX electrode to a RX electrode in an MH3 (e.g., metal mesh) touch-sensor pattern, having 0.25 mm thick color filter layer with eps_r=6 and 0.3 mm wide RX strips and 4.5 mm wide TX electrodes, the capacitance would be about 850 fF per RX electrode. (It is noted that "eps_r" is the relative dielectric constant for the particular material, which is typically around 6 for glass.) In the case of a 22 mm finger coupled to a RX electrode with a 0.5 mm cover glass (having eps_r=8) with an OCA layer thickness of 0.125 mm and the same MH3 pattern, the capacitance would be around 1990 fF. Assuming 20 TX electrodes as discussed above, the $V_{COM}$ layer to RX electrodes capacitance would be around 20*850 fF=17 pF.

In some embodiments, depending upon the connection resistance of the TX electrodes and the TX source impedance, the voltage coupled from the source line may be somewhat attenuated. The TX electrodes that are grounded to the $V_{COM}$ voltage will have some impedance back to the $V_{COM}$ electrode and the TX electrodes driven by an IC controller may possibly have different impedance. This can be illustrated with respect to FIG. 6C, which shows a circuit schematic for an example display integration structure, e.g., such as the display integration structure of FIG. 6A.

Figure 6C:
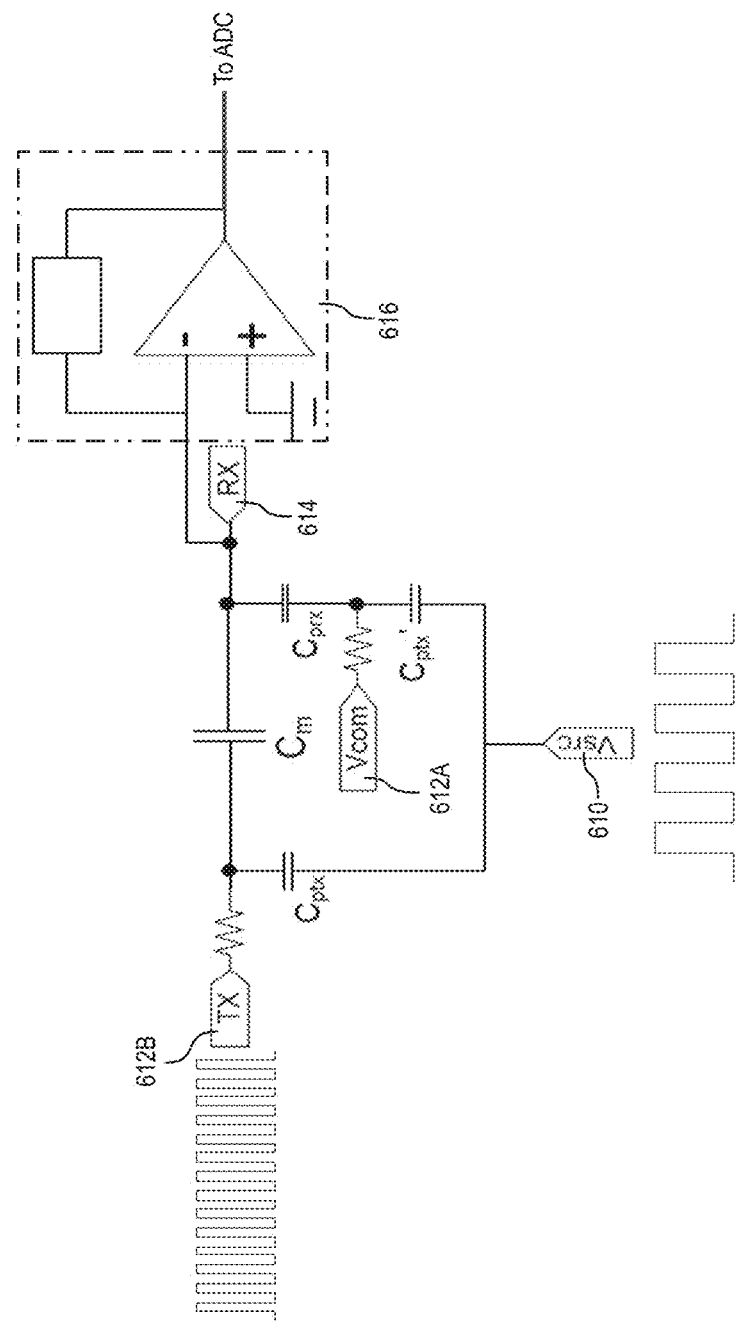
FIG. 6C illustrates example circuit schematic of parasitic noise coupling in an example display integration structure, e.g., such as the display integration structure of FIG. 6A.

In FIG. 6C, $V_{COM}$ electrode 612A is being driven to update a particular row of pixels in a LCD with an integrated touch sensor, in accordance with the techniques described herein. The update of the row of pixels also includes applying a voltage, $V_{SRC}$, to one or more source lines 610 of the pixels in the row. While $V_{COM}$ electrode 612A is being driven to update the row of pixels, a segment of $V_{COM}$ electrodes 612B is being driven with a TX signal to scan the integrated touch sensor. The segment of $V_{COM}$ electrodes 612B functions as a TX electrode that has mutual capacitance, $C_m$, to one or more RX electrodes 614. Thus, the scan TX signal on the segment of $V_{COM}$ electrodes 612B capacitively generates a signal in RX electrode(s) 614. The generated signal is received by integrator 616, which is coupled to RX electrode(s) 614. Integrator 616 processes the received signal into scan measurements and sends them for conversion to digital code, e.g., to an analog-to-digital converter (ADC). As illustrated in the circuit diagram of FIG. 6C, both source line(s) 610 and $V_{COM}$ electrode 612A are capacitively coupled and introduce noise in the touch scan operation. For example, parasitic capacitance $C_{ptx}$ is formed between source line(s) 610 and the segment of $V_{COM}$ electrodes 612B that is being driven to scan the integrated touch sensor, parasitic capacitance $C'_{ptx}$ is formed between source line(s) 610 and $V_{COM}$ electrode 612A, and parasitic capacitance $C_{prx}$ is formed between the segment of $V_{COM}$ electrodes 612B and RX electrode(s) 614. In this manner, noise from the source line(s) couples into the segment of $V_{COM}$ electrodes that is being driven to scan the integrated touch sensor. Noise from the source line(s) also couples through the $V_{COM}$ electrode currently being used to update the row of pixels with some attenuation by the $V_{COM}$ source impedance. Other $V_{COM}$ segments, which are not driven for the display update and which are used for touch sensing, are attenuated by the TX source impedance.

In the case illustrated in FIG. 6C, the charge coupled from the TX electrode (e.g., the segment of $V_{COM}$ electrodes being driven to scan the touch sensor) to the RX electrode(s) may be calculated. Assuming a 10V swing (e.g., worst case) on the source lines, and assuming that some of that signal is shunted to ground and is reduced further because column inversion by the parallel source lines shunts some current to ground, in the worst case the resulting signal can be assumed to be 5V on the $V_{COM}$ layer. If the signal was not shunting to ground very effectively, then the pixel would not work very well since the $V_{COM}$ electrode is the counter-electrode on the LCD cell. Thus, it is a good assumption that a substantial amount (e.g., ~5V) of the signal is attenuated when it passes through the $V_{COM}$ layer. If an attenuator is used to convert the voltage signal into a current (e.g., in non-bypass mode with 1.5× and the above attenuation), then only the charge injected into the integrator needs to be considered without regards to any headroom at the input of the attenuator. These assumptions yield $V_{COM}*C_{SRC\_RX}$=5V*17 pF=85 pC. A similar calculation for a 40V charger noise source yields 40V*2 pF=80 pC. Thus, the charge injected in an in-cell display stackup is nearly identical to the case of 40V noise from a charger. Therefore, with respect to the example embodiment of FIG. 6C, at a first level of approximation performing a touch scan operation while the LCD is being updated is similar to having a 40V noise source on a contact from a 22 mm finger on a typical in-cell stackup.

It is noted that one distinction, between having a 40V of charger noise and performing simultaneous touch scanning and display update according to the techniques described herein, is that the period between the voltage transitions for the Red-Green-Blue (R-G-B) sub-pixels is consistent while charger noise typically is not. The behavior of a H-synch LCD update with respect to R-G-B source line signals is discussed in the next section.

Display Horizontal Line Update Methods and Timing

In some embodiments, a horizontal line update (e.g., an update of a row of pixels) in a LCD may occur according to the following sequence:
1) An H-sync signal is generated.
2) A gate line is selected for a particular horizontal line (e.g., row of pixels), and is driven to a high voltage (e.g., 15V).
3) Source line digital-to-analog converter (DAC) generates a voltage, typically between +5V and –5V.
4) A 3:1 multiplexer (mux) is switched to "Red" (R) sub-pixel position.
5) The source line output buffer is held at a certain voltage, such that $V_{GS}$ of the pixel transistor is "ON".
6) Since the pixel transistor is "ON", if the source line voltage is held at a voltage close to the voltage of the corresponding $V_{COM}$ electrode, then 0V is applied across the liquid crystal molecules in the sub-pixel cell.
7) The liquid crystal sub-pixel is driven positive and negative with respect to the voltage of the $V_{COM}$ electrode ($\approx$–0.5V) on every other frame, in order to result in a net DC voltage applied across the liquid crystal over time. (This is one example of an inversion scheme.)
8) The process goes back to step #3 and is repeated for "Green" (G) and "Blue" (B) sub-pixels.
9) Once all pixels in the particular horizontal line (e.g., row of pixels) are processed, the update moves to the next horizontal line (e.g., the next row of pixels).

In the above example case of a 3:1 multiplexing, the entire set of sub-pixels of a particular color is updated. For example, in a display with a 1280×800 resolution, the 800 "Red" source lines would be updated at once, then the 800 "Green" source lines would be updated at once, then finally the 800 "Blue" source lines would be updated at once. This happens all within a single H-sync period. The gate line being driven is switched from the current horizontal line to the next one, then the process is repeated. Thus, within a span of 10 H-sync periods (e.g., which would take 130 us for the 10 H-syncs, or 13 us per H-sync, in the case of 1280 pixel rows), there will be a total of 30 incoming edges occurring in the 10 H-sync periods since there are 3 edges per H-sync period.

Figure 7:
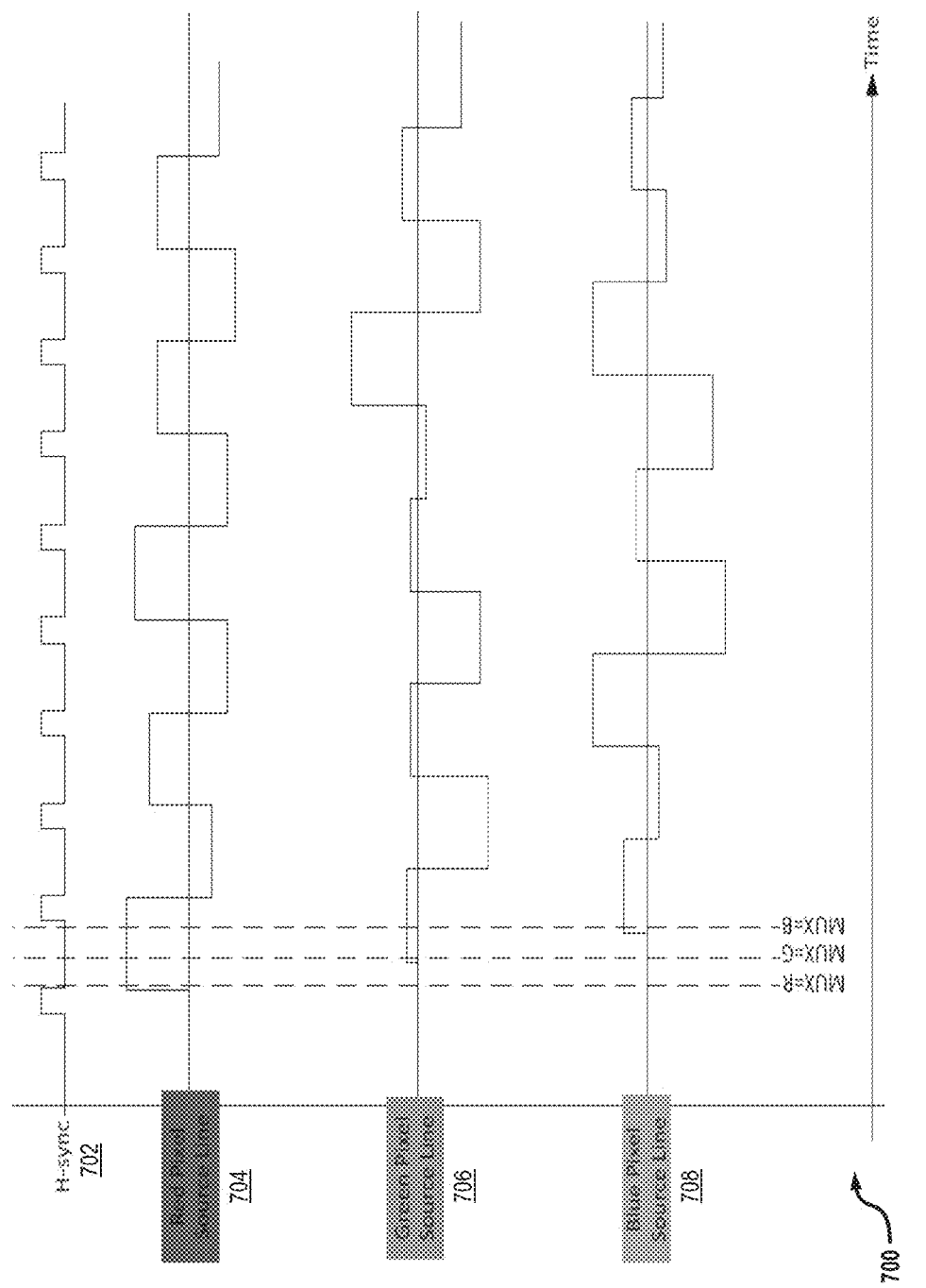
FIG. 7 illustrates a timing diagram for an H-sync LCD update that may be used with example embodiments herein.

FIG. 7 illustrates a timing diagram for an H-sync LCD update that may be used with example embodiments according to the techniques herein. Timing diagram 700 illustrates how voltages of "Red" source line signal 704, "Green" source line signal 706, and "Blue" source line signal 708, are switched relative to 10 periods of H-sync signal 702. Timing diagram 700 assumes that a line inversion is employed in the LCD updates. It is noted that inversion schemes for LCD updates may be implemented in various ways. However, in all such schemes the liquid crystals in the LCD cells need to be driven on a regular basis with opposing polarities so that the liquid crystals does not become physically drift. As discussed above, in some inversion schemes the voltage driving the pixel may be alternated every other frame, but other voltage alternating schemes may be used.

According to the techniques described herein, when touch scanning is performed simultaneously with display updates, it can be seen that not all edges of the source-line signal transitions will have corruption from the display source transition. This is illustrated in FIG. 8.

Figure 8:
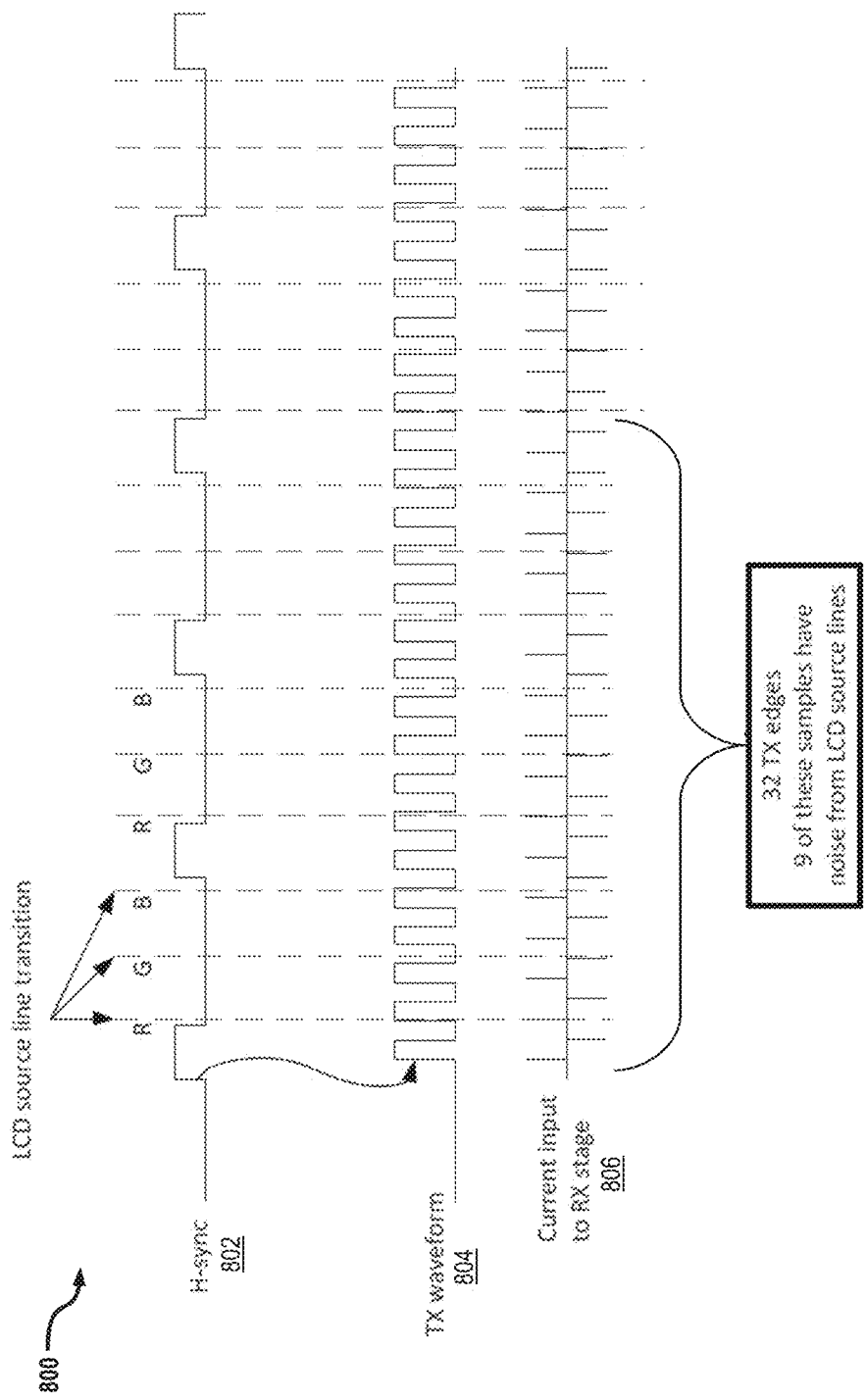
FIG. 8 illustrates a timing diagram for source line transitions in LCD updates that may be used with example embodiments herein.

FIG. 8 shows a timing diagram for source line transitions in LCD updates that may be used with example embodiments herein. Timing diagram 800 illustrates the timing of TX-signal waveform 804 and RX input signal 806 relative to several periods of H-sync signal 802. According to timing diagram 800, there are two source-line signal edges per TX-waveform period and thus the number of noise edges per TX period can be determined. Therefore, in some embodiments a parameter can be defined as the TX-waveform edges per LCD noise edges (which are the source line transitions). To get a sense of the typical case since the number of noise edges has two separate periods (period within H-sync, and time between H-sync periods), the number of noise edges per 32 TX samples (16 TX periods) can be considered. This can be defined as a β parameter:

$$\frac{32}{N_{NP}} = \beta$$

where $N_{NP}$ is the number of noise edges. If the β parameter is maximized, then some embodiments of the techniques described herein can employ a median filter to reject the bad samples. For example, if β=2, then the sampling is at roughly two times (2×) the noise frequency. However, since the R-G-B source line transitions occur one after another in a tight grouping, there may be some delay to the next H-sync period. Thus, the actual noise period may be shorter than the ⅓ of the H-sync period. Generally, however, the value of β may be adjusted in order to obtain an acceptable performance.

In some embodiments, an IC controller can reject large-amplitude charge injections from noise sources (e.g., such as chargers), by employing various filters such as attenuator(s), median filter(s), and windowing filter(s). In such embodiments, the LCD display update process can be treated as if it were a charger noise source, and the same filters may be applied to reduce the effect of the LCD noise on the touch scan measurements. In some embodiments, an IC controller (e.g., a touch IC) may employ multi-TX schemes (e.g., like a TX4 Hadamard code) to inject a charge (e.g., a +4 charge) on one time step of a touch scan operation, but zero charge on the remaining time steps of the scan operations. In these embodiments, this method of driving TX electrodes may be able to prevent display artifacts from occurring.

Noise Mitigation Techniques for In-Cell Noise

In various embodiments, various noise mitigation mechanisms and/or combinations thereof (e.g., such as mechanisms typically used for charger noise mitigation) may be used to mitigate noise from the LCD update process when touch scanning is performed simultaneously with display updates in accordance with the techniques described herein. Without limitation, examples of such noise mitigation mechanisms may include:

Median filter. A median filter takes at a group of samples as a set and throws away the outliers.

Windowing filter. A windowing filter is a non-linear filter that takes a number of samples (e.g., a number that is a power of 2) and assigns a weight to each sample. By doing this, the windowing filter becomes like a digital filter that has certain band-pass functionality.

Averaging filter. An averaging filter is a finite impulse response (FIR) filter that takes a number of samples grouped together by time, and then divides them by the total number of samples.

Multi-TX process. The multi-TX process is used to drive the TX electrodes of a touch sensor at certain frequencies and based on various parameters. The coding of the TX signal and the decoding of the received RX signal are performed based on unique codes and across several frequencies and channels. In touch scanning, the multi-TX process may be used to separate the TX drive signal from the noise (e.g., the multi-TX process may be used as a filter to filter out noise).

Attenuator. An attenuator is typically implemented as a set of hardware components coupled on RX channels and used to divide the input current of the received RX signals by some factor (by 2, by 4, etc.) This allows for maintaining linearity on all input RX channels so that the input RX signal is not clipped.

Large feedback cap. A large feedback cap is an active integrator, which may be implemented as a set of hardware components on the RX channels and which is typically used to convert the charge of the received RX signals to voltage.

In some embodiments, a median filter and a windowing filter may be applied to mitigate in-cell noise when touch scanning is performed simultaneously with display updates in accordance with the techniques described herein. For example, a median filter may be used to reject some number of samples that result from large noise spikes that occur from the source line voltage transitions during the update of a row of pixels, and a windowing filter may be used to weigh the remaining samples in order to smooth the RX signal received during touch scan operations. In some embodiments, an attenuator and a large feedback cap may be used to avoid saturation of the input stage of the RX channels that include the RX electrodes.

In some embodiments, depending on the chosen frequency, an averaging filter and a multi-TX process may be used when touch scanning is performed simultaneously with display updates in accordance with the techniques described herein. For example, the display horizontal line time (e.g., the time between two consecutive H-sync signals) is equal to $H_{TIME}$= (16.66 ms−$V_{BLANK\_PERIOD}$)/$Y_{PIXEL\_NUMBER}$. In the case of a display with 720 pixels per row (e.g., such as a display with 1280×720 resolution) with about 100 us of V-blank time, the $H_{TIME}$ is 12.9 us. Further, most of the conventional LCDs use 3:1 multiplexing either on the display TFT glass or built into the DDI controller. The display $H_{TIME}$ has a small dead-band before updating the "R", "G", "B" sub-pixels of a given horizontal line and a small dead-band afterward. (These dead-band times are commonly called the front and back porches, respectively.) In the case when the front porch is 1 us and back porch is 1 us, the remaining time is divided by 3 to get the first order approximation of the R-G-B pixel update period. Thus, in this example the R-G-B pixel update period would be (12.9−1−1)/3=3.63 us. This equates to a frequency of 137 KHz. Further, the display frame rate is typically accurate to about 2% from nominal, which means that for a 60 Hz nominal display update frequency, the actual update frequency would be in the range of approximately 58.5-61.5 Hz. Thus, to a first order approximation, it can be assumed that the R-G-B pixel update frequency would be 137 KHz+/−2%. It therefore follows that those embodiments of the techniques described herein which run at touch scan frequency (TX frequency) significantly higher than 137 KHz are capable of substantially removing the noise caused by the R-G-B source lines. In this regard, it is noted that for some hybrid in-cell stackups (e.g., such as stackups used in 6" LCDs, or smaller), the techniques for simultaneously touch scanning and display updates described herein may achieve TX scan frequencies of about 300 KHz, which is more than sufficient to achieve substantial noise reduction as discussed above.

Minimizing Display Artifacts from TX Switching

The inverse effect of the source-line noise problem described above may occur when touch scanning is performed simultaneously with display updates in accordance with the techniques described herein. For example, in some embodiments a TX electrode may shunt some of its current to source line(s) of the LCD when the TX electrode switches. This touch-scan-generated "noise" may alter the voltage that is driven onto the active pixels, thereby causing LCD display artifacts to occur. The problem of parasitic TX-to-source noise coupling and the way a display artifact may occur are illustrated through the circuit schematic and the timing diagram in FIG. 9.

Figure 9:
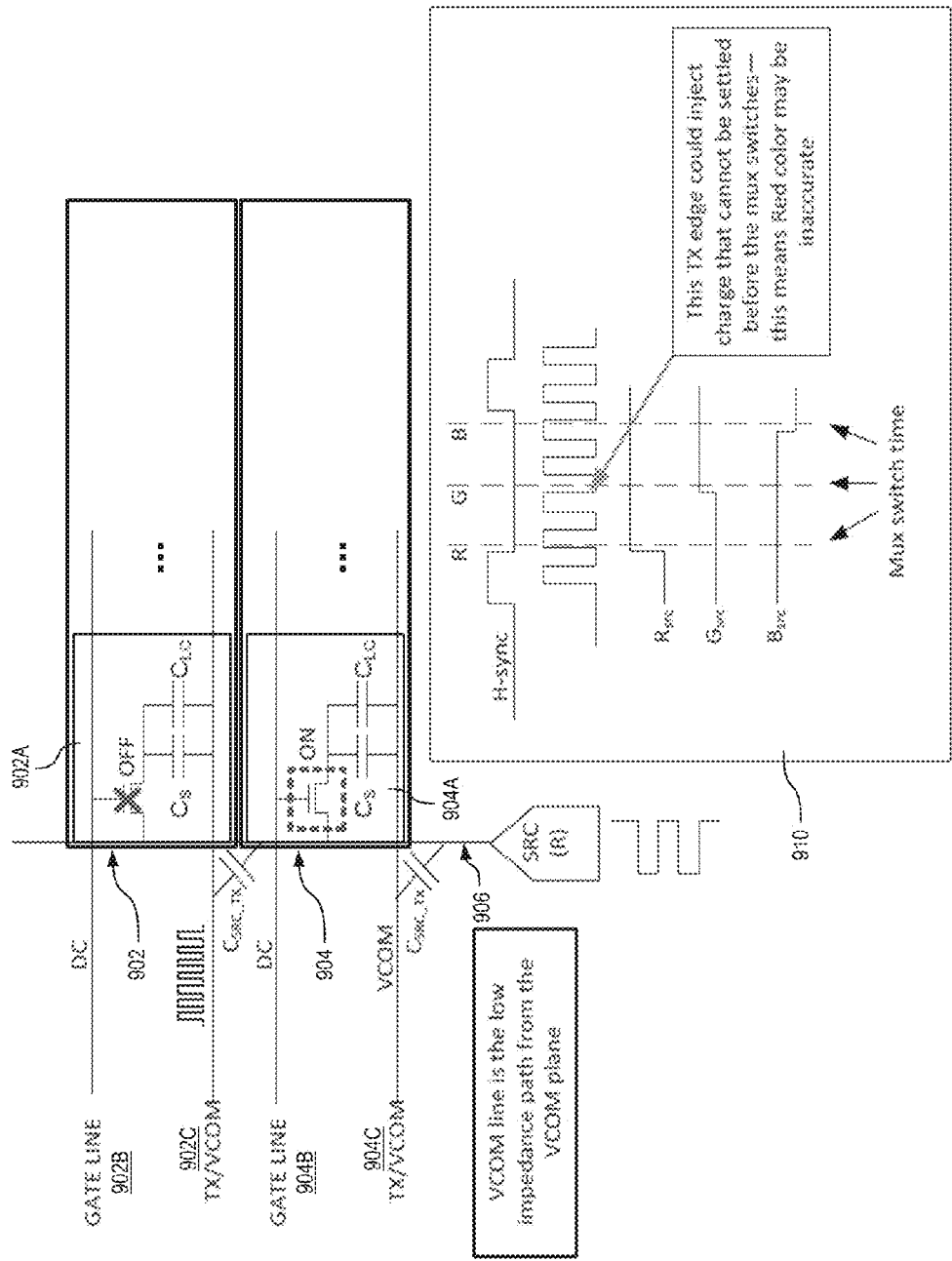
FIG. 9 illustrates example circuit schematic and timing diagram for parasitic TX-to-source noise coupling in an example display integration structure, e.g., such as hybrid in-cell stackup.

FIG. 9 illustrates a circuit schematic for an example hybrid in-cell stackup that may be used in some embodiments of the techniques described herein. LCD display pixel 902 includes sub-pixels 902A ("red" sub-pixel) and two other sub-pixels (not shown) for green and blue colors. Pixel 902 is coupled to gate line 902B and $V_{COM}$ electrode 902C, which is shared as part of a TX electrode of a touch sensor that is integrated in the structure of the LCD. Gate line 902B is coupled to the gates of the TFT transistors in the sub-pixels of pixel 902, such as sub-pixel 902A. Similarly, LCD display pixel 904 includes sub-pixels 904A ("red" sub-pixel) and two other sub-pixels (not shown) for green and blue colors. Pixel 904 is coupled to gate line 904B and $V_{COM}$ electrode 904C, which is shared as part of a TX electrode of a touch sensor that is integrated in the structure of the LCD. Gate line 904B is coupled to the gates of the TFT transistors in the sub-pixels of pixel 904, such as sub-pixel 904A. A source line 906 for "red" color is coupled to the sources of the TFT transistors in the "red" sub-pixels (e.g., such as sub-pixels 902A and 904A). During a display update, an appropriate voltage may be applied on source line 906 to update "red" sub-pixels 902A and 904A, with the transistor of sub-pixel 902A being turned off and the transistor of sub-pixel 904A being turn on. The proximity of $V_{COM}$ electrodes 902C and 904C to source line 906 may cause a parasitic capacitive coupling (represented as $C_{SRC\_TX}$) to occur.

For example, although some current flows into the source line (e.g., 906) when a TX/$V_{COM}$ electrode (e.g., 902C, 904C) switches, given enough time the digital-to-analog (DAC) output buffer on the source line will either add more current or subtract the extra current such that the correct voltage is applied on the sources of the TFT transistors in the pixels being updated (e.g., sub-pixels 902A, 904A). However, in the case when a TX scan signal transition occurs just before the mux switches the touch scan operation to the next TX electrode, some excess charge may still remain/exist on the display pixel, as shown in timing diagram 910 in FIG. 9. Such TX scan signal transitions, which occur (just) before a mux switch, will not be settled by the source line DAC thereby causing some display pixels to be in an inaccurate state.

Example Solutions for the Display Artifact Issue

To address the display artifact problem described above, some embodiments of the techniques described herein may drive the TX electrodes in a touch scan operation according to a code scheme. One example of such code scheme is a TX4 multi-phase TX code.

According to an example TX4 multi-phase TX code based on Hadamard sequences, each group of TX scan phases sums to +2 on each RX receive channel, as illustrated in Table 2 below. This means that a net positive or negative current after each TX scan signal transition could be expected.

TABLE 2

Example Hadamard Code for TX4
Example Hadamard code

|     | t0 | t1 | t2 | t3 |
| --- | --- | --- | --- | --- |
| TX0 | 1 | 1 | 1 | −1 |
| TX1 | 1 | 1 | −1 | 1 |
| TX2 | 1 | −1 | 1 | 1 |
| TX3 | −1 | 1 | 1 | 1 |
| Sum | 2 | 2 | 2 | 2 |

It is noted that there exist many Hadamard sequences with the above properties. For example, while it may require some more complex computations, various new codes may be designed that have a substantial number of the time steps that sum to 0. One example of such code is shown in Table 3 below. The Hadamard code for multi-phase TX4 in Table 3 provides multiple 0 net charge time steps and may be used in various embodiments of the techniques described herein when there is a significant display artifact caused by the TX scan signal transitions.

TABLE 3

Example Hadamard Code for TX4
with Multiple 0 Net charge time steps
New Code For Display Artifacts

|     | t0 | t1 | t2 | t3 |
| --- | --- | --- | --- | --- |
| TX0 | 1 | 1 | 1 | −1 |
| TX1 | 1 | 1 | −1 | 1 |
| TX2 | 1 | −1 | 1 | 1 |
| TX3 | 1 | −1 | −1 | −1 |
| Sum | 4 | 0 | 0 | 0 |

In example embodiments that employ the code in Table 3 to drive a TX scan signal, the +4 sum may be used when the display is not updating (e.g., during H-blank or V-blank quiescent periods) and the 0 sum may be used when touch scanning is being performed while the display is being updated. The code scheme in Table 3 has the characteristic that there is only one major non-zero charge injection per touch scan sequence, so this excess charge injection is driven in a scan operation during the display blank period to avoid any interference with the display update operations. Thus, the use of the code in Table 3 provides for using only $\frac{1}{4}^{th}$ of the time compared to a conventional time-division multiplexing scheme for display updates and touch scanning. This is illustrated graphically in FIG. 10.

Figure 10:
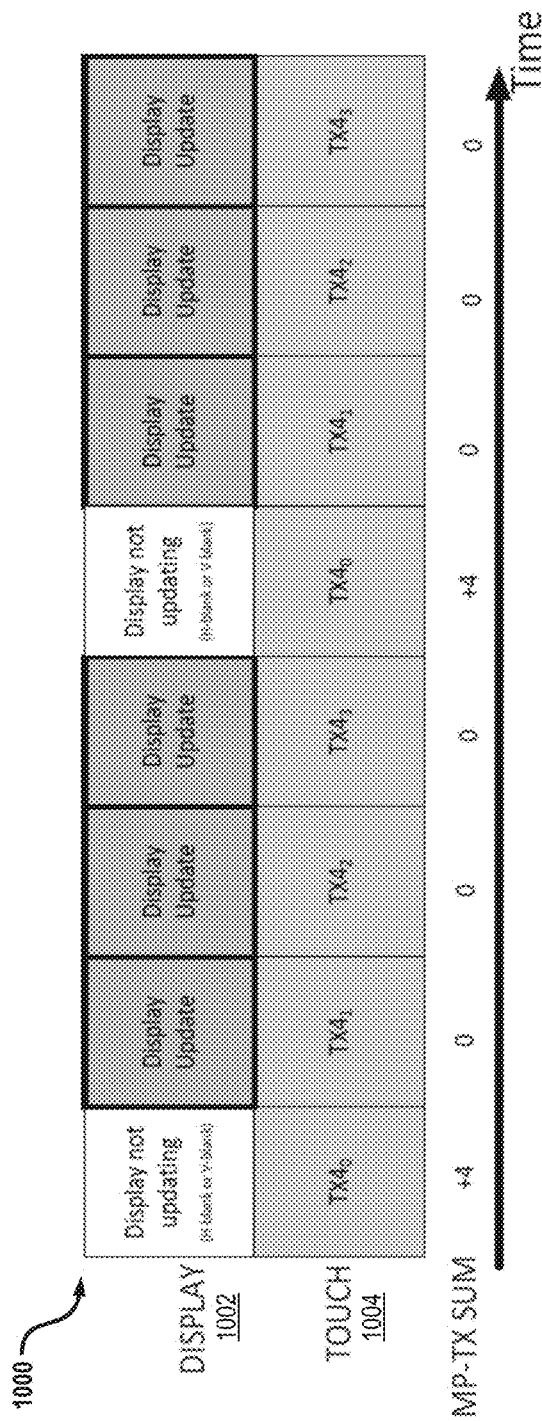
FIG. 10 illustrates a timing diagram for partial time-division multiplexing display update mode with a novel Hadamard TX4 code in accordance with example embodiments.

FIG. 10 illustrates a timing diagram for a partial time-division multiplexing display in-cell update mode, in accordance with some embodiments of the techniques described herein. Specifically, timing diagram 1000 illustrates display sequence 1002 and touch scan sequence 1004. According to touch scan sequence 1004, a TX scan signal with charge injection that sums up to +4 is used when touch scan operations are performed while the display is not being updated (e.g., during display quiescent periods), and a TX scan signal with charge injection that sums up to 0 is used when touch scan operations are performed when the display is being updated. In this manner, in these embodiments the +4 charge multi-TX state is used only when the display is not being updated, while the 0 net charge multi-TX state is used while the display is being updated, thereby significantly reducing the chance that display artifacts will occur.

Examples of Additional Features and Alternative Embodiments

In some embodiments, the techniques for simultaneous touch scanning and display updates described herein may be implemented in systems and touch-sensing devices that use different numbers of controllers.

For example, in some embodiments a single IC controller may be configured to perform both the display update operations on the display (e.g., LCD, AMOLED, etc.) and the touch scan operations on the touch sensor integrated within the structure of the display. In some embodiments, a DDI controller may be configured to synchronously drive both the display updates and the TX electrodes during touch scan operations, while a touch sense controller is configured to synchronously receive and process the measurement signals on the RX electrodes of the touch sensor. In some embodiments, the touch scan operations may be performed by a touch sense controller and the display update operations may be performed by a DDI controller, where the touch sense controller and the DDI controller are synchronized in accordance with the techniques described herein.

Figure 11A:
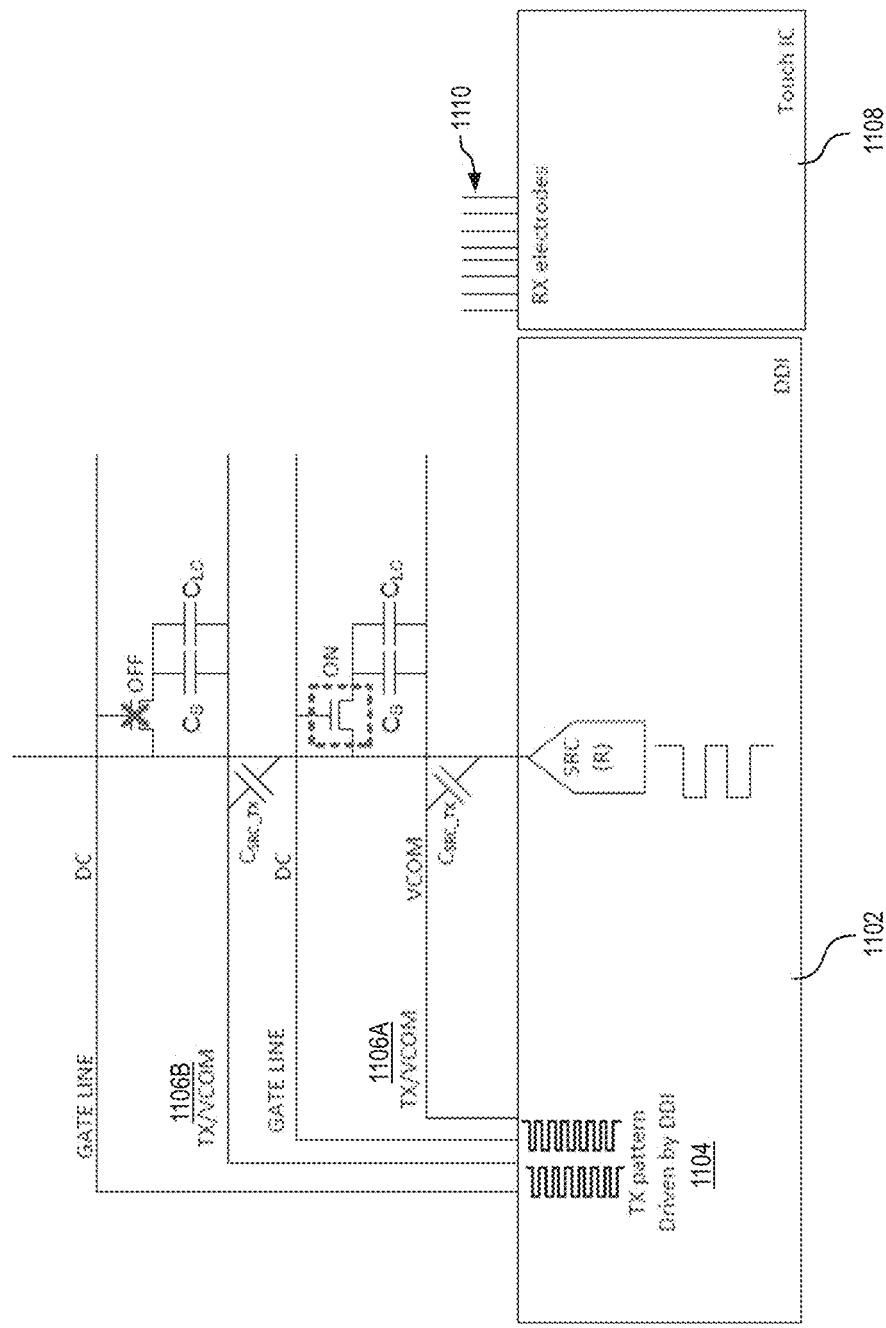
FIG. 11A illustrates a circuit schematic of an example embodiment in which a DDI controller drives TX electrodes during touch scan operations.

FIG. 11A illustrates a circuit schematic of an example embodiment in which a DDI controller drives TX electrodes during touch scan operations on a LCD with integrated touch sensor. In this example embodiment, DDI controller 1102 is configured to perform synchronized touch scanning and display updates in accordance with the techniques described herein. For example, DDI controller 1102 is configured to perform display updates and is coupled to provide touch IC controller 1108 with a synchronization signal. DDI controller 1102 is also configured to drive TX signal pattern 1104 on the TX/$V_{COM}$ electrodes (e.g., such as electrodes 1106A and 1106B) in order to scan the touch sensor synchronously with the display updates. Touch IC controller 1108 is configured to receive scan measurements on RX electrodes 1110 based on the synchronization signal received from DDI controller 1102.

Figure 11B:
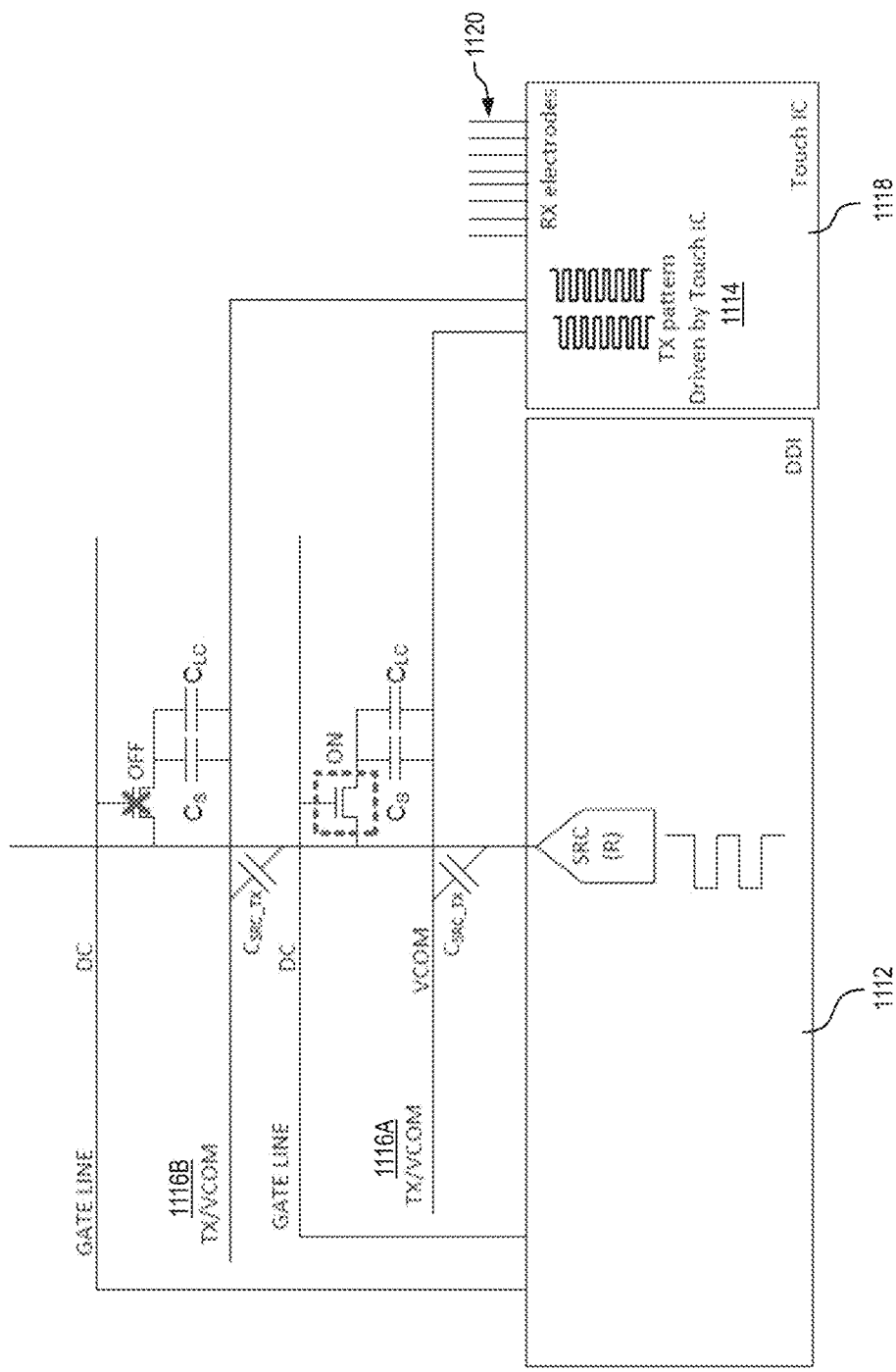
FIG. 11B illustrates a circuit schematic of an example embodiment in which a touch sense controller drives TX electrodes during touch scan operations.

FIG. 11B illustrates a circuit schematic of an example embodiment in which a touch sense controller drives TX electrodes during touch scan operations on a LCD with integrated touch sensor. In this example embodiment, DDI controller 1112 and touch IC controller 1118 are configured to perform synchronized touch scanning and display updates in accordance with the techniques described herein. DDI controller 1112 is configured to perform display update operations on the LCD and is coupled to provide touch IC controller 1118 with a synchronization signal. Touch IC controller 1118 is configured to scan the touch sensor synchronously with the display update operations. For example, touch IC controller 1118 is configured to drive TX signal pattern 1114 on the TX/$V_{COM}$ electrodes (e.g., such as electrodes 1116A and 1116B) based on the synchronization signal received from DDI controller 1112, and to receive scan measurements on RX electrodes 1120.

In some embodiments, the techniques for simultaneous touch scanning and display updates described herein may be implemented in systems and touch-scanning devices that use controllers that may be located in different places within the systems or devices.

FIG. 12A illustrates a touch-sensing device according to an example embodiment in which both the touch sense controller and the DDI controller are disposed within the touch-sensing device. Touch-sensing device 1200 may be a touchscreen panel that can be configured for use in a system such as, for example, a mobile communication device or a tablet. Touch-sensing device 1200 includes display 1202 with an integrated touch sensor (not shown), DDI controller 1204, and touch sense controller 1206. DDI controller 1204 and touch sense controller 1206 may be implemented as integrated circuits that are placed on a substrate (e.g., a TFT glass) that is part of (and/or is shared with) the structure of display 1202. DDI controller 1204 and touch sense controller 1206 are configured to perform the techniques for simultaneous touch scanning and display updates described herein. Flexible printed circuit (FPC) 1208 is coupled to DDI controller 1204 and touch sense controller 1206 to send/receive signals to/from other components in the underlying system. It is noted that in some embodiments, the DDI controller and the touch sense controller may be tightly integrated if both controllers are implemented as chips-on-glass (COG).

FIG. 12B illustrates a touch-sensing device according to an example embodiment in which the DDI controller is disposed within the touch-sensing device but the touch sense controller is disposed on a FPC coupled thereto. In the embodiment of FIG. 12B, touch-sensing device 1210 may be a touchscreen panel that can be configured for use in a system such as, for example, a mobile communication device or a tablet. Touch-sensing device 1210 includes display 1212 with an integrated touch sensor (not shown) and DDI controller 1214. DDI controller 1214 may be implemented as integrated circuit that is placed on a substrate (e.g., a TFT glass) that is part of (and/or is shared with) the structure of display 1212. Touch sense controller 1216 is implemented on (or as part of) FPC 1218. DDI controller 1214 and touch sense controller 1216 are configured to perform the techniques for simultaneous touch scanning and display updates described herein. FPC 1218 is coupled to DDI controller 1214 and touch sense controller 1216 to send/receive signals to/from other components in the underlying system. It is noted that due its small size, a standard touch sense controller (e.g., such as TSC 1216) can be placed on a FPC with minor cost increase in FPC material.

Figure 13:
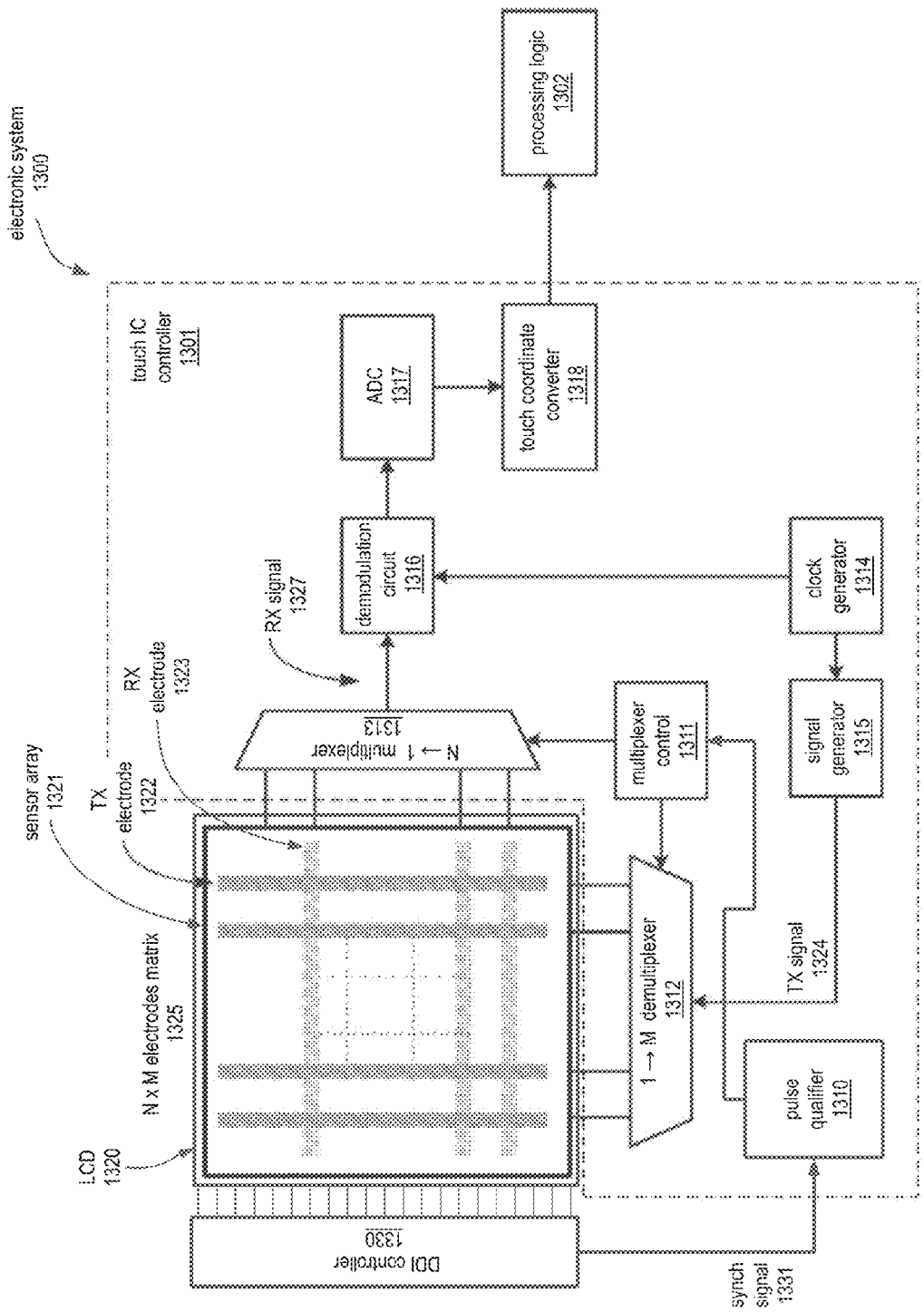
FIG. 13 is a block diagram illustrating an embodiment of an example system that employs the techniques described herein.

FIG. 13 is a block diagram illustrating one embodiment of an example electronic system that employs the techniques for simultaneous touch scanning and display updates described herein. Among other components (not shown), electronic system 1300 comprises LCD 1320 with an integrated sensor array 1321. For example, system 1300 may include components that comprise a computer (e.g., laptop, tablet, etc.) or a mobile communication device (e.g., smartphone, cellphone, etc.) with a touchscreen panel that includes LCD 1320 and sensor array 1321. LCD 1320 is coupled to DDI controller 1330, and touch IC controller 1301 is coupled to sensor array 1321. Sensor array 1321 is integrated within the structure of LCD 1320, e.g., within an in-cell or on-cell stackup as described heretofore.

DDI controller 1330 is configured to update the pixels of LCD 1320 to render display frames thereon. To render a frame on LCD 1320, DDI controller 1330 updates the pixels in the LCD row-by-row until all LCD pixels are refreshed and the display of the frame is completed. For example, to update a given pixel row, DDI controller 1320 drives a gate line corresponding to the pixel row and updates all source lines, corresponding to the pixels in the row, on the driven gate line. The driving of the gate line includes performing digital-to-analog voltage conversion based on the digital information representing the frame portion to be displayed by the pixels in the given row, and then applying the converted analog voltage to the driven gate line. To complete the frame, DDI controller 1330 repeats the process for all rows of pixels in LCD 1320. According to the techniques described herein, DDI controller 1330 is coupled to provide synchronization signal 1331 to touch IC controller 1301 so that touch IC controller 1301 can perform touch scan operations on sensor array 1321 simultaneously with the display updates. In some embodiments, the synchronization signal may be the actual hardware signal that is used to drive the display updates. For example, the synchronization signal may be the H-synch or the V-synch signal that is generated based on a common clock in the DDI controller to update the rows of pixels in the LCD.

According to the techniques described herein, touch IC controller 1301 is configured to scan sensor array 1321 while DDI controller 1330 is updating a pixel of rows in LCD 1320. A scan operation on sensor array 1321 obtains measured signal values that represent capacitances on the sensor elements of the sensor array. The measured signal values may be used to compute the location coordinates of a contact on sensor array 1321, when such contact is present on, or is proximate to, the sensor array.

Sensor array 1321 includes a matrix 1325 having "N" RX electrodes and "M" TX electrodes. For example, matrix 1325 includes TX electrode 1322 and RX electrode 1323. Each of the electrodes in matrix 1325 is connected with the capacitance sensing circuitry of touch IC controller 1301 through demultiplexer 1312 and multiplexer 1313. The TX and RX electrodes in matrix 1325 may be arranged so that each of the TX electrodes intersects, or is interleaved (e.g., on the same layer), with the RX electrodes while maintaining electrical isolation from them. Thus, each TX electrode may be capacitively coupled with each of the RX electrodes. For example, TX electrode 1322 is capacitively coupled with receive electrode 1323 to form a sensor element from which a discrete measurement can be obtained that is separate and distinct from measurements obtained from other sensor elements that are formed by other combinations of TX and RX electrodes.

Touch IC controller 1301 includes pulse qualifier 1310, multiplexer control 1311, demultiplexer 1312, multiplexer 1313, clock generator 1314, signal generator 1315, demodulation circuit 1316, and analog-to-digital converter (ADC) 1317. ADC 1317 is further coupled with touch coordinate converter 1318. Touch coordinate converter 1318 outputs a signal to processing logic 1302, which may be configured to perform various operations such as determining location coordinates of contacts on sensor array 1321, tracking contacts on the sensor array, and the like. In various embodiments, touch IC controller 1301 may be configured to use mutual capacitance sensing, self-capacitance sensing, or a mixed-mode that uses both mutual and self-capacitance sensing.

Clock generator 1314 supplies a clock signal to signal generator 1315, which produces a TX scan signal 1324 to be applied to the TX electrodes of touch sensor 1321. For example, in some embodiments the signal generator may include a set of switches that operate according to the clock signal from the clock generator. The switches may generate a TX scan signal by periodically connecting the output of the signal generator to a first voltage and then to a second voltage, where said first and second voltages are different. The output of signal generator 1315 is coupled to demultiplexer 1312, which allows a TX signal 1324 to be applied to any of the "M" TX electrodes of sensor array 1321.

According to the techniques for simultaneous touch scanning and display update described herein, pulse qualifier 1310 is coupled to receive synchronization signal 1331 from DDI controller 1330 and to send a control signal to multiplexer control 1311. Synchronization signal 1331 may be the H-synch or the V-synch signal that is generated based on a common clock in DDI controller 1330 to update the rows of pixels in LCD 1320. Pulse qualifier 1310 includes one or more circuits configured to receive synchronization signal 1331 and to determine precisely if an edge detected within the synchronization signal is a valid edge. The circuit(s) in pulse qualifier 1310 count a number of clock cycles (e.g., 0 or more cycles) from a detected valid edge in synchronization signal 1331, and then use the number of clock cycles to generate a control signal that is applied to multiplexer control 1311. Based on the control signal from pulse qualifier 1310 (and possibly on firmware/hardware configuration/logic), multiplexer control 1311 starts a touch scan operation by selecting the particular TX electrode(s) to which a TX signal 1324 is applied. In this manner, synchronization signal 1331 from DDI controller 1330 is passed through pulse qualifier 1310 to trigger the start of touch scan operations (e.g., either immediately or after a fixed delay) synchronously with the update of a particular row of pixels in LCD 1320.

Multiplexer control 1311 is coupled to receive the control signal from pulse qualifier 1310. Multiplexer control 1311 controls demultiplexer 1312 so that a TX signal 1324 is applied to each TX electrode (e.g. such as 1322) in a controlled sequence that allows scanning of sensor array 1321 simultaneously with updates to the rows of pixels in LCD 1320. Demultiplexer 1312 may also be used to ground, float, or connect an alternate signal to the other TX electrodes to which the TX signal 1324 is not currently being applied.

Because of the capacitive coupling between the TX electrodes and the RX electrodes, a TX signal 1324 applied to each TX electrode induces a current within each of the RX electrodes. For instance, when the TX signal 1324 is applied to TX electrode 1322 through demultiplexer 1312, the TX signal 1324 induces a RX signal 1327 on the RX electrodes in matrix 1325. The RX signal 1327 on each of the RX electrodes can then be measured sequentially by using multiplexer 1313 to connect each of the "N" RX electrodes to demodulation circuit 1316 in sequence. To improve performance, multiplexer 1313 may also be segmented to allow more than one of the RX electrodes in matrix 1325 to be routed to additional demodulation circuits 1316. In an optimized configuration, where there is a 1-to-1 correspondence of instances of demodulation circuit 1316 with RX electrodes, multiplexer 1313 may not be present in the system.

The induced current signal 1327 is rectified by demodulation circuit 1316. The rectified current output by demodulation circuit 1316 can then be filtered and converted to a digital code by ADC 1317.

The digital code may then be converted to touch location coordinates indicating a position of a contact on sensor array 1321 by touch coordinate converter 1318. The output signal of touch coordinate converter 1318 may be transmitted as an input signal to processing logic 1302. In some embodiments, the input signal is received at an input of processing logic 1302.

In some embodiments, the input of the processing logic may be configured to receive the capacitance measurements indicating a plurality of row coordinates and a plurality of column coordinates. Alternatively, or in addition to, the input of the processing logic may be configured to receive the row coordinates and the column coordinates that are computed by the touch coordinate converter. For example, processing logic 1302 may be configured to generate (or to receive, e.g., from touch coordinate receiver 218) signal measurements that represent diff signals for the sensor elements in sensor array 1321. The capacitance used to compute a diff signal for a sensor element may be a self-capacitance and/or a mutual capacitance of the sensor element.

For example, in mutual capacitance sensing operations, signal values representing the mutual capacitance associated with each sensor element can be sensed by selecting every available combination of TX electrode and RX electrode using demultiplexer 1312 and multiplexer 1313. When a conductive object, such as a finger, approaches electrode matrix 1325, the object causes a decrease in the mutual capacitance between only some of the electrodes. For instance, if a finger is placed near the sensor element formed by TX electrode 1322 and RX electrode 1323, the presence of the finger will decrease the mutual capacitance between electrodes 1322 and 1323. As a result, demodulation circuit 1316 will receive less current, the filtered output from demodulation circuit 1316 will cause ADC 1317 to generate digital code that is different from other non-affected sensor elements, and using the digital code touch coordinate converter 1318 can identify the RX electrode and the TX electrode that form the affected sensor element. Thus, touch coordinate converter 1318 can determine the location on sensor array 1321 of the sensor element that was affected by the finger. By determining the mutual capacitances associated with each sensor element formed by the TX and RX electrodes in matrix 1325 in this manner, the locations of one or more touch contacts on touch sensor array 1321 may be determined. The determination may be sequential, in parallel, or may occur more frequently at commonly used electrodes.

The techniques for simultaneous touch scanning and display updates described herein offer improved solutions over the conventional time-division multiplexing solutions. For example, the techniques described herein do not require LCD manufacturers to fine tune their displays to allow for gaps (e.g., quiescent periods) in display updating that may cause flicker, color change, and luminance change (e.g., the display may transmit less light). Further, the techniques described herein do not require display manufacturers to use custom DDIs that are typically more expensive. This allows display manufacturers to reduce the time-to-market and the costs that are associated with adding touch functionality to a standard display by using the conventional time-division multiplexing techniques. Thus, the techniques described herein provide a cost advantage in the total display+touch solution when using in-cell or on-cell stackups, and therefore provide the display manufacturers with a total solution that minimizes the overhead of integrating touch functionality in the display and maximizes performance.

The techniques for simultaneous touch scanning and display updates described herein also allow for the extension of in-cell and on-cell stackup designs to touch-sensing devices of larger sizes that are currently considered to be too large to work properly due to the time required to perform display updates and accurate touch scanning. For example, in LCDs above 8 inches, the time required to measure the capacitances on all sensor elements increases linearly as the length of either the shorter or the longer axis—depending upon whether the RX electrodes are attached to the shorter or the longer axis of the display. In LCDs above 7 inches, it is typically required that the touch IC controller is attached to RX electrodes on the shorter axis of the display, so that the expected signal-to-noise (SNR) ratio is about half the SNR or half the touch scanning frame rate compared to when the touch IC controller is attached to RX electrodes along the long axis. Thus, in-cell stackup designs become increasingly difficult to implement for displays above 7-8 inches without using much more expensive touch IC controllers that have enough RX channels to scan RX electrodes that are disposed on the long axis of the LCD. In contrast, by providing for simultaneous touch scanning and display updates, the techniques described herein allow in-cell and on-cell stackup designs to be extended to LCDs of 8 inches and beyond at a significant cost improvement because expensive touch IC controllers with a large number of RX channels are not required.

Various embodiments of the techniques for simultaneous touch scanning and display updates may include or use various operations. These operations may be performed by hardware components, software, firmware, or a combination thereof. As used herein, the term "coupled to" may mean coupled directly or indirectly through one or more intervening components. Any of the signals may be multiplexed with other signals and may be provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may include or use operations that are implemented as a firmware and/or computer-program product that may include firmware and/or software instructions stored on a non-transitory computer-readable medium, e.g., such as volatile storage and/or non-volatile storage. These instructions may be used to program a touch-sensing device that includes one or more general-purpose or special-purpose processors (e.g., such as Central Processing Units, or CPUs) or equivalents thereof (e.g., such as processing cores, processing engines, microcontrollers, and the like), so that when executed by the processor(s) or the equivalents thereof, the instructions cause the device to perform the operations of the techniques described herein. A computer-readable medium may also include one or more mechanisms for storing or transmitting information in a form (e.g., software, processing application) that is readable by a machine (e.g., such as a device or a computer). Examples of non-transitory computer-readable storage medium may include, without limitation, electromagnetic storage medium (e.g., floppy disks, hard disks, and the like), optical storage medium (e.g., CD-ROM), magneto-optical storage medium, read-only memory (ROM), random-access memory (RAM), erasable programmable memory (e.g., EPROM and EEPROM), flash memory, various types of firmware, and any other now-known or later-developed type of medium that is suitable for storing information.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
   updating a row of pixels in a display;
   wherein the display comprises a thin-film transistor (TFT) layer, a top polarizing layer, and a sensor array that comprises transmit (TX) electrodes, wherein the TX electrodes are disposed between the TFT layer and the top polarizing layer;
   while the row of pixels is being updated, driving one or more of the TX electrodes to sense at least a portion of the sensor array, wherein the one or more of the TX electrodes are not associated with the row of pixels that is being updated;
   wherein the one or more of the TX electrodes are included in a first group or in a second group, wherein the first group includes those of the TX electrodes that are even-numbered and the second group includes those of the TX electrodes that are odd-numbered.

2. The method of claim 1, wherein driving the one or more of the TX electrodes comprises driving the one or more of the TX electrodes in an area of the display that does not include the row of pixels that is being updated.

3. The method of claim 1, wherein driving the one or more of the TX electrodes comprises driving the one or more of the TX electrodes according to a pattern that avoids the row of pixels, in the display, that is being updated.

4. The method of claim 1, wherein driving the one or more of the TX electrodes comprises driving the one or more of the TX electrodes according to a code scheme.

5. The method of claim 1, wherein:
when the row of pixels being updated corresponds to at least one of the TX electrodes in the first group, then the one or more of the TX electrodes are in the second group;
when the row of pixels being updated corresponds to at least one of the TX electrodes in the second group, then the one or more of the TX electrodes are in the first group.

6. The method of claim 1, wherein the display is a liquid crystal display (LCD).

7. A device comprising:
a display comprising a thin-film transistor (TFT) layer and a top polarizing layer;
a sensor array integrated within the display, the sensor array comprising transmit (TX) electrodes that are disposed between the TFT layer and the top polarizing layer;
one or more integrated circuit (IC) controllers configured at least to:
update a row of pixels in the display; and
while the row of pixels is being updated, drive one or more of the TX electrodes to sense at least a portion of the sensor array, wherein the one or more of the TX electrodes are not associated with the row of pixels that is being updated;
wherein the one or more of the TX electrodes are included in a first group or in a second group, wherein the first group includes those of the TX electrodes that are even-numbered and the second group includes those of the TX electrodes that are odd-numbered.

8. The device of claim 7, further comprising an in-cell stackup in which the TX electrodes are disposed on the top side of the TFT layer or on the bottom side of a color filter layer, the color filter layer being disposed between the TFT layer and the top polarizing layer.

9. The device of claim 8, wherein the sensor array comprises receive (RX) electrodes, the RX electrodes being disposed between the TFT layer and the color filter layer within the in-cell stackup.

10. The device of claim 7, further comprising an on-cell stackup in which the TX electrodes are disposed between the top polarizing layer and a color filter layer, the color filter layer being disposed between the TFT layer and the top polarizing layer.

11. The device of claim 10, wherein the sensor array comprises receive (RX) electrodes, the RX electrodes being disposed between the top polarizing layer and the color filter layer within the on-cell stackup.

12. The device of claim 7, wherein the display is a liquid crystal display (LCD) and segments of $V_{COM}$ electrodes in the LCD are shared as the TX electrodes of the sensor array.

13. The device of claim 7, wherein the one or more IC controllers include a display driver IC (DDI) that is configured to update the row of pixels in the LCD.

14. The device of claim 7, wherein the one or more IC controllers include a touch IC that is configured to drive the one or more of the TX electrodes while the row of pixels is being updated.

15. The device of claim 7, wherein:
the one or more IC controllers include a display driver IC (DDI) controller and a touch IC controller, the touch IC controller being coupled to receive a synchronization signal from the DDI controller;
the DDI controller is configured to update the row of pixels in the LCD; and
the touch IC controller is configured to drive the one or more of the TX electrodes based on the synchronization signal.

16. The device of claim 7, wherein the display is a liquid crystal display (LCD).

17. A device controller comprising:
one or more integrated circuits configured at least to:
update a row of pixels in a display; and
while the row of pixels is being updated, drive one or more transmit (TX) electrodes to sense at least a portion of a sensor array integrated within the display, wherein the one or more TX electrodes are not associated with the row of pixels that is being updated;
wherein the one or more TX electrodes are included in a first group or in a second group, wherein the first group includes those of the TX electrodes that are even-numbered and the second group includes those of the TX electrodes that are odd-numbered.

18. The device controller of claim 17, wherein the device controller is configured to couple to the display, the display comprises a thin-film transistor (TFT) layer and a top polarizing layer, and the sensor array comprises the TX electrodes that are disposed between the TFT layer and the top polarizing layer.

19. The device controller of claim 17, wherein the device controller is configured to couple to a touchscreen panel that includes the display and the display is a liquid crystal display (LCD).

* * * * *